US012673295B2

(12) United States Patent
Hoshino

(10) Patent No.: US 12,673,295 B2
(45) Date of Patent: Jul. 7, 2026

(54) METAL ION RECOVERY DEVICE, METAL RECOVERY SYSTEM, AND METAL ION RECOVERY METHOD

(71) Applicant: National Institutes for Quantum Science and Technology, Chiba (JP)

(72) Inventor: Tsuyoshi Hoshino, Kamikita-gun (JP)

(73) Assignee: National Institutes for Quantum Science and Technology, Chiba (JP)

( * ) Notice: Subject to any disclaimer, the term of this patent is extended or adjusted under 35 U.S.C. 154(b) by 1070 days.

(21) Appl. No.: 17/598,386

(22) PCT Filed: Mar. 13, 2020

(86) PCT No.: PCT/JP2020/011039
§ 371 (c)(1),
(2) Date: Sep. 27, 2021

(87) PCT Pub. No.: WO2020/203166
PCT Pub. Date: Oct. 8, 2020

(65) Prior Publication Data
US 2022/0152556 A1 May 19, 2022

(30) Foreign Application Priority Data
Mar. 29, 2019 (JP) ................................. 2019-069257

(51) Int. Cl.
*B01D 63/08* (2006.01)
*B01D 61/46* (2006.01)
(Continued)

(52) U.S. Cl.
CPC ......... *B01D 61/46* (2013.01); *B01D 63/0822* (2022.08); *C02F 1/4693* (2013.01);
(Continued)

(58) Field of Classification Search
CPC .......... B01D 61/46; B01D 61/50; C22B 3/42; C22B 26/12; C25B 13/04
See application file for complete search history.

(56) References Cited

U.S. PATENT DOCUMENTS 4,129,494 A * 12/1978 Norman .................... C25C 7/00
204/278.5
4,619,751 A * 10/1986 Robinson .................. C25C 7/04
204/267
5,951,843 A * 9/1999 Itoh ........................... C25C 3/02
204/263
8,431,005 B1 * 4/2013 Zbranek ................. C01D 15/08
205/510

(Continued)

FOREIGN PATENT DOCUMENTS

JP     H10102270 A    4/1998
JP     2010029797 A    2/2010
(Continued)

OTHER PUBLICATIONS

Chile Patent Office, Office Action issued in CL 2021-02505 dated Aug. 18, 2022.
(Continued)

*Primary Examiner* — Lorne E Meade
(74) *Attorney, Agent, or Firm* — Wood Herron & Evans LLP

(57) ABSTRACT

What is provided is a metal ion recovery device including: a raw solution tank that is configured to store a metal ion containing raw solution including metal ions; a recovery liquid tank that is configured to store a metal ion recovery liquid including metal ions recovered from the metal ion containing raw solution; a metal ion selective permeable membrane that separates the raw solution tank and the recovery liquid tank and selectively transmits the metal ions; an anode that is arranged on a side of the metal ion selective permeable membrane close to the raw solution tank; a cathode that is arranged on a side of the metal ion selective permeable membrane close to the recovery liquid tank; a porous current collector that is formed of a conductive
(Continued)

material; a first spacer that is configured to maintain a gap between the metal ion selective permeable membrane and the anode; and a second spacer that is configured to maintain a gap between the metal ion selective permeable membrane and the cathode, in which the anode is arranged to be electrically connected to the metal ion selective permeable membrane through the porous current collector, and the cathode is arranged to be electrically connected to the metal ion selective permeable membrane through the porous current collector, and two or more of at least one of the raw solution tank and the recovery liquid tank are provided.

19 Claims, 12 Drawing Sheets

(51) Int. Cl.
    *C02F 1/469*      (2023.01)
    *C22B 26/12*      (2006.01)
    *C02F 103/08*     (2006.01)
(52) U.S. Cl.
    CPC ........ *C22B 26/12* (2013.01); *B01D 2313/143* (2013.01); *B01D 2313/146* (2013.01); *B01D 2313/345* (2013.01); *C02F 2103/08* (2013.01)

(56)                References Cited

U.S. PATENT DOCUMENTS

| 9,932,653 B2 * | 4/2018 | Hoshino | ................. C22B 26/10 |
| 10,689,766 B2 * | 6/2020 | Hoshino | ................... C25B 9/23 |
| 12,268,993 B2 * | 4/2025 | Goldszal | ............... B01D 61/50 |
| 2016/0201163 A1 * | 7/2016 | Hoshino | ................. C22B 26/22 |
| | | | 204/520 |
| 2019/0032230 A1 | 1/2019 | Hoshino | |
| 2022/0017630 A1 | 1/2022 | Zhao et al. | |
| 2022/0176320 A1 | 6/2022 | Hoshino | |

FOREIGN PATENT DOCUMENTS

| JP | 2015034315 A | 2/2015 |
| JP | 6233877 B2 | 11/2017 |
| WO | 2015020121 A1 | 2/2015 |
| WO | 2017131051 A1 | 8/2017 |
| WO | 2020203187 A1 | 10/2020 |

OTHER PUBLICATIONS

Japanese Patent Office, Office Action issued in JP 2021-511361 dated Jun. 6, 2023.
PCT Office, International Search Report issued in PCT/JP2020/011039 mailed on Jun. 2, 2020.

* cited by examiner

FIG. 14

METAL ION RECOVERY DEVICE, METAL RECOVERY SYSTEM, AND METAL ION RECOVERY METHOD

TECHNICAL FIELD

The present invention relates to a metal ion recovery device, a metal recovery system, and a metal ion recovery method.

Priority is claimed on Japanese Patent Application No. 2019-069257, filed on Mar. 29, 2019, the content of which is incorporated herein by reference.

BACKGROUND ART

Lithium ion batteries have been widely used in recent years. Lithium ion batteries are used, for example, as power sources for electric vehicles, portable devices, and the like.

In addition, lithium is used as a raw material for lithium ion batteries. Lithium used as a raw material for lithium ion batteries is also used in the production of tritium as a fuel for nuclear fusion reactors in addition to lithium ion batteries.

For these reasons, in recent years, there has been a rapidly increasing demand for lithium.

Lithium is included in seawater. Therefore, a technique for recovering lithium included in seawater has been studied. Also, a technique for recovering lithium from a used lithium ion battery has been studied.

PTL1 and PTL2 disclose recovery devices for recovering lithium ions from a raw solution including lithium ions. The recovery devices include a selective permeable membrane formed of a lithium ion conductor, a first electrode fixed to a first main surface side of the selective permeable membrane, and a second electrode fixed to a second main surface side of the selective permeable membrane. In the recovery devices disclosed in PTL1 and PTL2, using the structure having the selective permeable membrane, the first electrode, and the second electrode, the raw solution including lithium ions and the recovery liquid are separated from each other and the lithium ions in the raw solution are moved to the recovery liquid.

In the recovery devices disclosed in PTL1 and PTL2, in order to recover metal ions, it is necessary to electrically connect the selective permeable membrane and the electrode. In the recovery devices disclosed in PTL1 and PTL2, there is a description of a configuration in which a current collector for bringing the selective permeable membrane into close contact with the electrode is arranged.

CITATION LIST

Patent Literature

[PTL 1] Japanese Patent (Granted) Publication No. 6233877

[PTL 2] PCT International Publication No. WO 2017/131051

SUMMARY OF INVENTION

Technical Problem

From the viewpoint of effective utilization of resources, it is desired to recover lithium ions from a lithium ion containing raw solution such as seawater or a waste battery treatment liquid. However, the conventional metal ion recovery devices described in PTL1 and PTL2 have difficulty in recovering a large amount of metal ions as described below. The conventional metal ion recovery devices have a structure in which a metal ion containing raw solution and a metal ion recovery liquid are separated from each other using one metal ion conductor (selective permeable membrane). Therefore, it is difficult to improve the recovery efficiency of metal ions per device.

For the purpose of improving the recovery efficiency of metal ions, it is possible to mount a plurality of selective permeable membranes on one device. In this case, deviation in arrangement occurs between the selective permeable membrane and the electrode, specifically, between the selective permeable membrane and the current collector, or between the current collector and the electrode. When the deviation occurs, it is difficult to maintain the electrical connection between the selective permeable membrane and the electrode, and the metal ion recovery efficiency cannot be improved.

The present invention has been made in consideration of the above circumstances and an object thereof is to provide a metal ion recovery device capable of efficiently recovering metal ions.

Another object of the present invention is to provide a metal recovery system and a metal ion recovery method using the above metal ion recovery device.

Solution to Problem

[1] A metal ion recovery device including:
a raw solution tank that is configured to store a metal ion containing raw solution including metal ions;
a recovery liquid tank that is configured to store a metal ion recovery liquid including metal ions recovered from the metal ion containing raw solution;
a metal ion selective permeable membrane that partitions the raw solution tank and the recovery liquid tank and selectively transmits the metal ions;
an anode that is arranged on the raw solution tank side of the metal ion selective permeable membrane;
a cathode that is arranged on the recover liquid tank side of the metal ion selective permeable membrane;
a porous current collector that is formed of a conductive material;
a first spacer that is configured to maintain a gap between the metal ion selective permeable membrane and the anode; and
a second spacer that is configured to maintain a gap between the metal ion selective permeable membrane and the cathode,
in which the anode is arranged to be electrically connected to the metal ion selective permeable membrane through the porous current collector, and the cathode is arranged to be electrically connected to the metal ion selective permeable membrane through the porous current collector, and
two or more of at least one of the raw solution tank and the recovery liquid tank are provided.

[2] A metal ion recovery device including:
a raw solution tank that is configured to store a metal ion containing raw solution including metal ions;
a recovery liquid tank that is configured to store a metal ion recovery liquid including metal ions recovered from the metal ion containing raw solution;
a metal ion selective permeable membrane that partitions the raw solution tank and the recovery liquid tank and selectively transmits the metal ions;

an anode that is integrally provided on a side of the metal ion selective permeable membrane close to the raw solution tank; and a cathode that is integrally provided on a side of the metal ion selective permeable membrane close to the recovery liquid tank, in which two or more of at least one of the raw solution tank and the recovery liquid tank are provided.

[3] The metal ion recovery device according to [1] or [2], in which the raw solution tank and the recovery liquid tank are alternately arranged in parallel through the metal ion selective permeable membrane.

[4] The metal ion recovery device according to any one of [1] to [3], in which the metal ion is a lithium ion.

[5] A metal ion recovery device unit including:

a plurality of the metal ion recovery devices according to any one of [1] to [4], in which each of the metal ion recovery devices is connected by a pipe connecting the raw solution tanks and a pipe connecting the recovery liquid tanks.

[6] A metal recovery system including:

the metal ion recovery device according to any one of [1] to [4] or the metal ion recovery device unit according to [5]; and a refining device that is connected to the recovery liquid tank of the metal ion recovery device or the metal ion recovery device unit and is configured to extract metal ions included in the metal ion recovery liquid as a solid containing the metal.

[7] A metal ion recovery method including:

using the metal ion recovery device according to any one of [1] to [4] or the metal ion recovery device unit according to [5], transmitting metal ions included in the metal ion containing raw solution stored in the raw solution tank of the metal ion recovery device or the metal ion recovery device unit through the metal ion selective permeable membrane, and recovering the metal ions with the metal ion recovery liquid stored in the recovery liquid tank.

Advantageous Effects of Invention

According to the present invention, it is possible to provide a metal ion recovery device capable of improving the recovery efficiency of metal ions (for example, lithium ions) and recovering a large amount of metal ions.

Further, according to the present invention, it is possible to provide a metal recovery system and a metal ion recovery method using the metal ion recovery device.

BRIEF DESCRIPTION OF DRAWINGS

FIG. 14 is an exploded perspective view of the metal ion recovery cell shown in FIG. 13.

DESCRIPTION OF EMBODIMENTS

Figure 1:
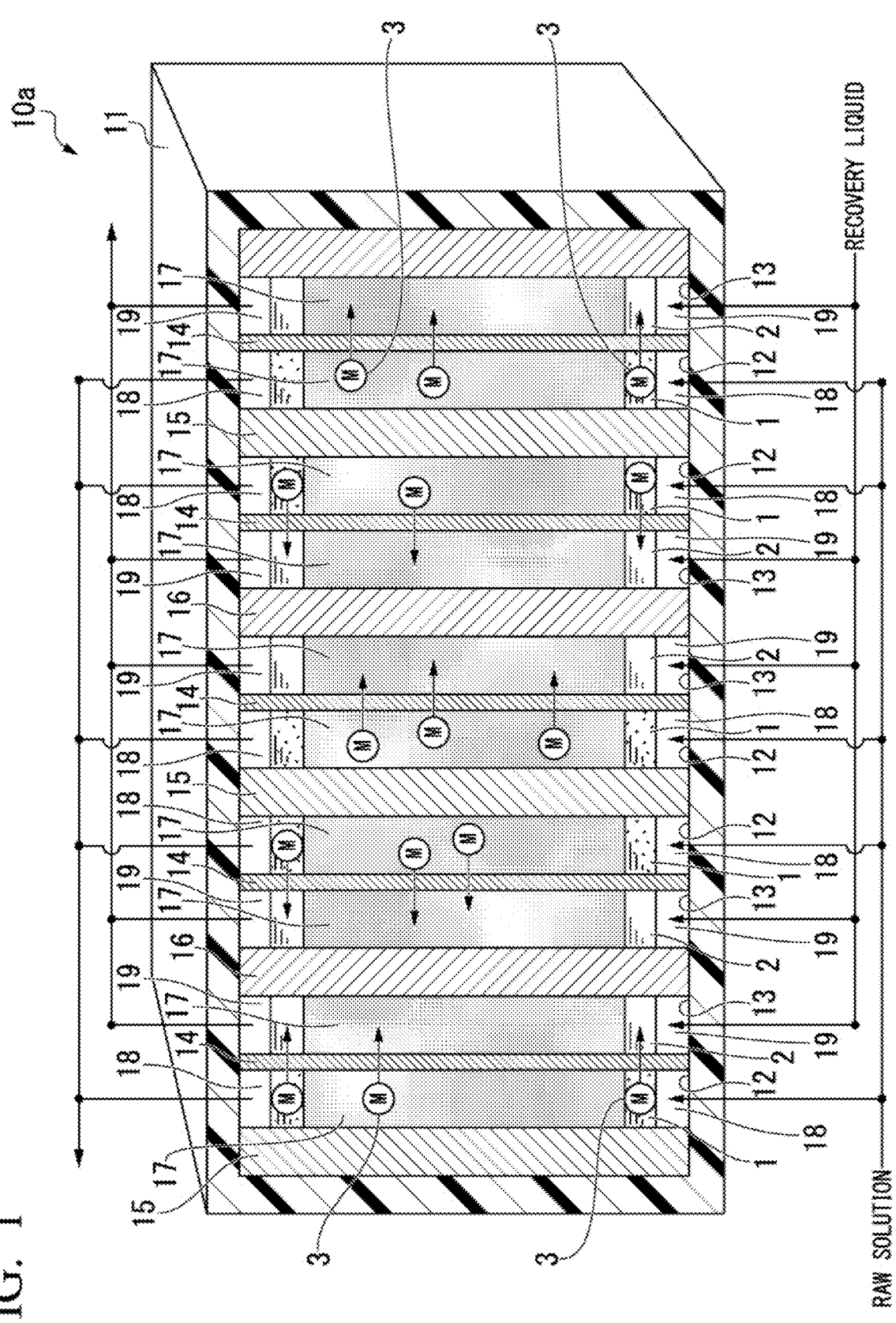
FIG. 1 is a cross-sectional perspective view of an example of a plate-like selective permeable membrane parallel type metal ion recovery device according to one embodiment of the present invention.

A metal ion recovery device according to an embodiment is a device that recovers metal ions from a metal ion containing raw solution including metal ions. Examples of the metal ions to be recovered include ions of alkali metals, alkaline earth metals, and transition metals. Examples of alkali metals include lithium, sodium, and cesium. Examples of alkaline earth metals include beryllium, magnesium, and calcium. Examples of transition metals include cobalt, nickel, and manganese.

For example, in the embodiment in which lithium ions are recovered as metal ions, the metal ion containing raw solution is a lithium ion containing raw solution including lithium ions.

As the lithium ion containing raw solution, for example, seawater, salt lake brine water, bittern, waste battery treatment liquid, and the like can be used. The lithium concentration in the lithium ion containing raw solution is about 0.17 ppm in the case of the seawater, about 1000 ppm in the case of the salt lake brine water, about 50 to 1000 times of the lithium concentration of the seawater in the case of the bittern, and 2000 to 3000 ppm in the case of the waste battery treatment liquid.

As the lithium ion containing raw solution, it is preferable to use a solution including lithium ions at a lithium concentration of 0.1 mol/L or more. Since the lithium concentration of the salt lake brine water and the waste battery treatment liquid is high, the salt lake brine water and the waste battery treatment liquid are suitable for lithium ion containing raw solutions. In addition, since the bittern can be easily produced from seawater, the bittern is suitable for a lithium ion containing raw solution.

As the metal ion containing raw solution (for example, lithium ion containing raw solution), a mineral lithium solution, concentrated seawater obtained from a seawater desalination plant, hot spring water, and the like may be also used, in addition to the seawater, salt lake brine water, bittern, or a waste battery treatment liquid.

The metal ion containing raw solution (for example, lithium ion containing raw solution) may include water, organic solvents, or the like as solvents. The solvent included in the metal ion containing raw solution (for example, lithium ion containing raw solution) is preferably water from the viewpoint of burden on the environment.

The metal ion recovery liquid is a liquid for recovering metal ions transmitted through the metal ion selective permeable membrane. The metal ion recovery liquid is not particularly limited as long as the metal ion recovery liquid is a solvent in which the metal ions can be dissolved. The metal ion recovery liquid may be, for example, the same as the solvent of the metal ion containing raw solution.

As the metal ion recovery liquid, for example, water (preferably water with less contamination of metal ions such as pure water and RO water (reverse osmosis membrane permeated water)) is preferable. Alternatively, a solvent effective for the subsequent step of purifying and recovering the metal ions recovered in the recovery liquid may be used.

Suitable examples of the lithium ion recovery liquid in a case of recovering lithium ions as metal ions include water (preferably water with a small amount of mixed metal ions such as pure water and RO water). Alternatively, for example, as the solvent effective for the subsequent step of recovering the lithium ions recovered in the recovery liquid as solid-like lithium, dilute hydrochloric acid may be used.

The metal ion recovery device comprises a raw solution tank, a recovery liquid tank, a metal ion selective permeable membrane that partitions the raw solution tank and the recovery liquid tank (hereinafter, also simply referred to as a "selective permeable membrane"), an anode, and a cathode. The raw solution tank is a tank that stores a metal ion containing raw solution. The recovery liquid tank is a tank that stores a metal ion recovery liquid including metal ions recovered from a metal ion containing raw solution.

The selective permeable membrane is constituted of a metal ion conductor (hereinafter, also referred to as a "metal ion conductor") as a main body.

In the embodiment, the expression "a metal ion conductor as a main body" means that 50% by mass or more of the total mass of the selective permeable membrane is a metal ion conductor.

The percent by mass of the metal ion conductor in the total mass of the selective permeable membrane is preferably 70% by mass or more and more preferably 80% by mass or more to obtain a selective permeable membrane having a high ion conductivity.

For example, the selective permeable membrane may be formed of a ceramic material which is a metal ion conductor, may be formed of a composite material of a metal ion conductor and a support, or may be formed of a composite material of a metal ion conductor and an adsorption layer that contributes to improvement of metal ion conductivity.

The metal ion conductor included in the selective permeable membrane is only required to be formed of a material that can conduct metal ions. The metal ion conductor is preferably formed of a material that has a crystal structure including a conductive metal element and exhibits ion conductivity due to migration of the metal ions in the crystal.

The metal ion conductor used as the selective permeable membrane is determined according to the kind of metal ion which is transmitted by the selective permeable membrane, that is, the kind of metal ion to be recovered.

The ion conductivity of the metal ion conductor is preferably $10^{-4}$ S cm$^{-1}$ to $10^{-1}$ S cm$^{-1}$ and more preferably $10^{-3}$ S cm$^{-1}$ to $10^{-1}$ S cm$^{-1}$. As the ion conductivity increases, the permeability to the metal ions increases. For example, when the ion conductivity is 10 S cm$^{-1}$ or more, a selective permeable membrane is said to have high permeability to the metal ions. Therefore, the metal ions in the metal ion containing raw solution can be efficiently recovered, and thus this case is preferable. The upper limit of the ion conductivity is not particularly limited but may be, for example, $10^{-1}$ S cm$^{-1}$ or less.

For example, in a case in which the metal ions (that is, metal ions to be recovered) that are transmitted by the metal ion selective permeable membrane are lithium ions, as a metal ion conductor used as the selective permeable membrane, specifically, lithium ion conductors such as lithium nitride ($Li_3N$), $Li_{10}GeP_2S_{12}$, lithium lanthanum titanate: $(Li_x,La_y)TiO_z$ (here, x=3a−2b, y=⅔−a, z=3−b, 0≤a≤⅙, 0≤b≤0.06, x>0) (hereinafter, also referred to as "LLTO"), and $Li_{1+x+y}Al_x(Ti,Ge)_{2-x}Si_yP_{3-y}O_{12}$ (here, 0≤x≤0.6, 0≤y≤0.6), which is a Li substituted type Na super ionic conductor (NASICON) type crystal, and the like can be used.

All of these lithium ion conductors exhibit a high lithium ion conductivity of $10^{-4}$ S cm$^{-1}$ or more and are super lithium ion conductors that have high selectivity to lithium ions. Accordingly, the metal ion recovery device including the selective permeable membrane having the super lithium ion conductor as a main body can efficiently recover the lithium ions in the raw solution.

Among the lithium ion conductors, particularly, lithium lanthanum titanate (LLTO) is preferable. This is because lithium lanthanum titanate has high water resistance and the performance is not easily deteriorated even when immersed in the lithium ion containing raw solution and the lithium ion recovery liquid for a long period of time. Specifically, $Li_{0.29}La_{0.57}TiO_3$ is preferably used as lithium lanthanum titanate.

Similar to lithium, sodium and cesium, which are alkali metals, may be elements that form metal ion conductors.

In a case in which the metal ions to be recovered are sodium ions, a sodium ion conductor is used for the selective permeable membrane. Examples of the sodium ion conductor include compounds containing sodium such as β alumina, $Na_2(BH_4)(NH_2)$, and $Na_3SbS_4$—$Na_4SnS_4$.

In addition, in a case in which the metal ions to be recovered are cesium ions, a cesium ion conductor is used as the selective permeable membrane. As the cesium ion conductor, for example, compounds containing cesium such as $(Cs_x,La_y)TiO_z$ (here, x is 0.29, y is 0.57, and z is 3) are considered to be used.

In a case in which the metal ions to be recovered are ions of alkaline earth metals or transition metals, as in the case of the alkali metal ions, as a conductor of a metal ion to be recovered, a compound containing the metal element can be used.

The selective permeable membrane is preferably a sintered body formed of the metal ion conductor. In a case in which the metal ions to be recovered are lithium ions, particularly, the selective permeable membrane is preferably a sintered body formed of lithium lanthanum titanate (LLTO).

It is preferable that the sintered body of the metal ion conductor is a hard material having excellent water pressure resistance from the viewpoint of excellent durability. In addition, since the sintered body of the metal ion conductor is a porous body in which fine particles formed of the metal ion conductor are bonded (sintered), there are fine irregularities on the surface. Accordingly, when the selective permeable membrane is the sintered body formed of the metal ion conductor, the surface area is large. Therefore, the metal ion recovery device including the selective permeable membrane formed of the sintered body formed of the metal ion conductor is preferable since the contact area between the metal ion containing raw solution and the metal ion conductor is large and the metal ions in the metal ion containing raw solution can be efficiently recovered.

The shape of the selective permeable membrane is not particularly limited, but may be, for example, a plate-like shape (including a sheet-like shape).

The plate-like selective permeable membrane may be flat or corrugated.

The size of the flat plate-like selective permeable membrane is not particularly limited.

The average thickness of the flat plate-like selective permeable membrane is preferably, for example, 0.01 to 20 mm, more preferably 0.1 to 5 mm. When the average thickness is 20 mm or less, the metal ions can be efficiently conducted and thus this case is preferable. On the other hand, when the average thickness is 0.01 mm or more, the durability is good and thus this case is preferable.

In addition, the maximum dimension of the flat plate-like selective permeable membrane in plan view is preferably 10 to 2000 mm, more preferably 250 to 1000 mm, and even more preferably 300 to 500 mm.

The maximum dimension of the selective permeable membrane in plan view is, for example, the length of a diagonal line in a case in which the selective permeable membrane is rectangular in plan view, and is the diameter when the selective permeable membrane is circular in plan view. When the maximum dimension is 10 mm or more, the metal ions can be efficiently conducted, and thus this case is preferable. On the other hand, when the maximum dimension is 2000 mm or less, the selective permeable membrane is not easily broken and the durability is excellent. Thus, this case is preferable.

Particularly, in a case in which the flat plate-like selective permeable membrane is a sintered body of the metal ion conductor, it is preferable that the average thickness is 0.2 to 1.0 mm and the maximum dimension in plan view is 30 to 100 mm Such a flat plate-like selective permeable membrane is preferable since the flat plate-like selective permeable membrane can be easily and efficiently produced and can efficiently conduct the metal ions. Specifically, for example, the selective permeable membrane can be formed in a square shape in plan view with average thickness of about 0.5 mm and a side length of about 5 cm.

In addition, in a case in which the selective permeable membrane has a flat plate-like shape, if necessary, a plurality of selective permeable membranes may be used by bonding the selective permeable membranes in the in-plane direction.

The anode is electrically connected to the surface of the selective permeable membrane on the raw solution tank side. The anode and the surface of the selective permeable membrane on the raw solution tank side may be electrically connected to each other through a porous current collector. Alternatively, the anode may be arranged in close contact with the surface of the selective permeable membrane on the raw solution tank side to achieve electrical connection. That is, the anode may be integrally formed on the surface of the selective permeable membrane on the raw solution tank side. As the conductive material for the anode, a conventionally known conductive material can be adopted.

As the conductive material for the anode, for example, a material including one or two or more elements selected from Pt, Cu, Au, Ag, C, Fe, W, Mo, Ni, Co, Cr, Ti, Ir, Mn, La, Sr, Al, Pb, Zn, and Rh is preferable and a material including one or two or more elements selected from Pt, Cu, Fe, C, Ag, and Ti is more preferable. Such an anode material may be an alloy, and examples thereof include TiIr and stainless steel (SUS). Particularly, it is more preferable that the anode has Pt, C, or Ti as a main component. This is because the anode formed of the material having one of these elements as a main component has excellent corrosion resistance, for example, even in a case in which corrosive gas such as chlorine gas and/or fluorine gas is generated by recovering the metal ions in the raw solution.

The shape of the anode is not particularly limited. The shape of the anode may have a regular pattern such as a plate-like shape, a mesh shape, a rod-like shape, a stripe shape, a dot shape, a lattice shape, or a honeycomb shape, or an irregular pattern. In a case in which the anode and the selective permeable membrane are electrically connected to each other through a porous current collector, the shape of the anode can be a continuous shape such as, for example, a plate-like shape, a mesh shape, a rod-like shape, a lattice shape, or a honeycomb shape. In a case in which the anode is arranged in close contact with the selective permeable membrane to achieve electrical connection (in a case in which the anode is integrally formed with the selective permeable membrane), the shape of the anode is not particularly limited and may be any shape.

In addition, as the porous current collector for electrically connecting the anode and the selective permeable membrane, for example, a felt-like or sponge-like conductive material can be used. As the conductive material for the porous current collector, those provided as exemplary examples of the conductive material for the anode can be used. Preferably, a conductive material including C, Ti, Pt, Cu, Fe, and Ag is used.

The cathode is electrically connected to the surface of the selective permeable membrane on the recovery liquid tank side. The cathode may be connected to the surface of the selective permeable membrane on the recovery liquid tank side through a porous current collector. Alternatively, the cathode may be arranged in close contact with the surface of the selective permeable membrane on the recovery liquid tank side to achieve electrical connection. That is, the cathode may be integrally formed on the surface of the selective permeable membrane on the recovery liquid tank side.

As the conductive material for the cathode, those provided as exemplary examples of the conductive material for the anode can be used. However, the conductive materials forming the anode and the cathode may be the same or different from each other.

The shape of the cathode is not particularly limited, and those provided as exemplary examples of the shape of the anode can be employed. However, the shapes of the anode and the cathode may be the same or different from each other.

As the porous current collector for electrically connecting the cathode and the selective permeable membrane, for example, a felt-like or sponge-like conductive material can be used. As the conductive material for the porous current collector, those provided as exemplary examples of the conductive material for the anode can be used.

Here, one pair or both pairs of the anode and the selective permeable membrane and the cathode and the selective permeable membrane may be electrically connected through the porous current collector.

In addition, one or both of the anode and the cathode may be arranged in close contact with different main surfaces of the selective permeable membrane to achieve electrical connection between these members.

In a case in which the anode or the cathode is arranged in close contact with the selective permeable membrane to achieve electrical connection between the anode or cathode and the selective permeable membrane (in a case in which the electrode is formed integrally with the selective permeable membrane), it is preferable to use a conductive porous membrane as the anode or the cathode. This is because the metal ion containing raw solution or the metal ion recovery liquid can be brought into contact with the selective permeable membrane through the anode or the cathode.

The average pore diameter of the conductive porous membrane used the anode or the cathode is preferably 0.5 to 10 μm. As the average pore diameter of the conductive porous membrane decreases, the contact area of these three components, the selective permeable membrane, the conductive porous membrane, and the metal ion containing raw solution or the metal ion recovery liquid, increases and thus, the amount of metal ion permeation can be increased. When the average pore diameter of the conductive porous membrane is 10 μm or less, the effect of increasing of the contact area of the three components, the surface of the selective permeable membrane, the conductive porous membrane, and the metal ion containing raw solution or the metal ion recovery liquid is remarkable. Therefore, the effect of increasing the amount of metal ion permeation is high and preferable. The lower limit value of the average pore diameter of the conductive porous membrane is not particularly limited as long as the selective permeable membrane can be brought into contact with the metal ion containing raw solution or the metal ion recovery liquid through the conductive porous membrane. For example, the average pore diameter of the conductive porous membrane can be set to 0.001 μm or more and may be typically 0.5 μm or more.

The conductive porous membrane can be formed, for example, by applying a paste including a conductive material onto the surface of the selective permeable membrane and firing the paste.

The anode may be arranged so as to cover at least a part of the liquid contact surface (the metal ion containing raw solution contact surface) of the selective permeable membrane. The cathode may be arranged so as to cover at least a part of the liquid contact surface (the metal ion recovery liquid contact surface) of the selective permeable membrane. That is, the anode and the cathode are only required to have a shape that covers a part of the liquid contact surface of the selective permeable membrane. By using the anode and/or cathode smaller than the liquid contact surface of the selective permeable membrane, it is possible to achieve size reduction and/or slimming (thickness reduction) of the metal ion recovery device and to reduce the electrode cost.

The anode and the cathode may be arranged so as to cover the entire liquid contact surface of the selective permeable membrane. The anode or cathode having a shape (outer peripheral shape) that matches the shape (outer peripheral shape) of the liquid contact surface of the selective permeable membrane is a suitable example of the embodiment. The anode or cathode having such a shape is suitable since, for example, in a case in which the anode or cathode is electrically connected to the selective permeable membrane through the porous current collector, the potential of the entire liquid contact surface of the selective permeable membrane is kept almost constant. Here, the shapes of the anode and the cathode may be the same or different from each other.

The metal ion recovery device of the embodiment comprises two or more of at least one of a raw solution tank and a recovery liquid tank. The metal ion recovery device of the embodiment can be, for example, a plate-like selective permeable membrane parallel type metal ion recovery device in which plate-like selective permeable membranes are arranged in parallel.

Plate-Like Selective Permeable Membrane Parallel Type Metal Ion Recovery Device

FIG. 1 is a cross-sectional perspective view of an example of a plate-like selective permeable membrane parallel type metal ion recovery device according to an embodiment of the present invention.

A metal ion recovery device 10a shown in FIG. 1 comprises a raw solution tank 12, a recovery liquid tank 13, a selective permeable membrane 14, an anode 15, a cathode 16, a porous current collector 17, a first spacer 18, and a second spacer 19. Here, a case in which the anode 15 and the cathode 16 are plate-like electrodes (not allowing a raw solution and a recovery liquid to flow) will be described as an example.

The anode 15 may be arranged inside the raw solution tank 12. The cathode 16 may be arranged inside the recovery liquid tank 13. The anode 15 is electrically connected to the surface of the selective permeable membrane 14 on the raw solution tank 12 side through the porous current collector 17 (for example, a carbon felt). The cathode 16 is electrically connected to the surface of the selective permeable membrane 14 on the recovery liquid tank 13 side through the porous current collector 17 (for example, a carbon felt).

In the metal ion recovery device 10a shown in FIG. 1, the first spacer 18 is arranged between the metal ion selective permeable membrane 14 and the anode 15, and a predetermined gap is maintained between the metal ion selective permeable membrane 14 and the anode 15. Then, the porous current collector 17 is housed in the gap formed by the arrangement of the first spacer 18.

In the metal ion recovery device 10a shown in FIG. 1, the second spacer 19 is arranged between the metal ion selective permeable membrane 14 and the cathode 16, and a predetermined gap is maintained between the metal ion selective permeable membrane 14 and the anode 16. Then, the porous current collector 17 is housed in the gap formed by the arrangement of the second spacer 19.

The distance (interval) between the metal ion selective permeable membrane 14 and the anode 15 is preferably the same as the thickness of the porous current collector 17. That is, the thickness of the first spacer 18 is preferably the same as the thickness of the porous current collector 17. The thickness of the porous current collector 17 before the porous current collector is provided in the metal ion recovery device 10a is preferably equal to or larger than the thickness of the first spacer 18. The thickness of the porous current collector 17 is preferably set to be equal to the thickness of the first spacer 18 by being provided in the porous current collector in the metal ion recovery device 10a and compressed and restrained in the thickness direction. By housing the porous current collector 17 having the above thickness in the gap formed by the first spacer 18 having such a thickness, the metal ion selective permeable membrane 14, the anode 15, and the porous current collector 17 can be brought into close contact with one another. In other words, by housing the porous current collector 17 having the above thickness in the gap formed by the first spacer 18 having such a thickness, electrical connection between the metal ion selective permeable membrane 14 and the anode 15 through the porous current collector 17 can be suitably maintained.

Similarly, the distance (interval) between the metal ion selective permeable membrane 14 and the cathode 16 is preferably the same as the thickness of the porous current collector 17. That is, the thickness of the second spacer 19 is preferably the same as the thickness of each porous current collector 17. The thickness of the porous current collector 17 before the porous current collector is provided in the metal ion recovery device 10a is preferably equal to or larger than the thickness of the second spacer 19. The thickness of the porous current collector 17 is preferably set to be equal to the thickness of the second spacer 19 by being provided in the porous current collector in the metal ion recovery device 10a and compressed and restrained in the thickness direction. By housing the porous current collector 17 having the above thickness in the gap formed by the second spacer 19 having such a thickness, the metal ion selective permeable membrane 14, the cathode 16, and the porous current collector 17 can be brought into close contact with one another. In other words, by housing the porous current collector 17 having the above thickness in the gap formed by the second spacer 19 having such a thickness, electrical connection between the metal ion selective permeable membrane 14 and the cathode 16 through the porous current collector 17 can be suitably maintained.

In a suitable embodiment, the anode 15, the first spacer 18, the selective permeable membrane 14, the second spacer 19, and the cathode 16 are laminated in this order, and a load is applied so as to restrain the laminate in a direction along the lamination direction. By restraining the laminate with a predetermined load in this manner, while preventing deviation in arrangement of the anode 15, the cathode 16, and the selective permeable membrane 14, the electrical connection between the metal ion selective permeable membrane 14, the anode 15, and the cathode 16 through the porous current collector 17 can be maintained at a high level. In addition, the porous current collector 17 can be prevented from being damaged.

The shape of the first spacer 18 is not particularly limited as long as a predetermined gap can be formed between the anode 15 and the selective permeable membrane 14. The shape of the second spacer 19 is not particularly limited as long as a predetermined gap can be formed between the cathode 16 and the selective permeable membrane 14. The shape of the first spacer 18 and the second spacer 19 may be, for example, a block shape (cube shape, column shape), a rod-like shape, a frame shape, a U shape, or an L shape. As the first spacer 18 and the second spacer 19, a single spacer or a plurality of spacers having one shape may be used, or a plurality of spacers having different shapes may be used in combination. By using the first spacer 18 and the second spacer 19 having the same shape, the configuration of the entire metal ion recovery device can be simplified, which is preferable.

Figure 2:
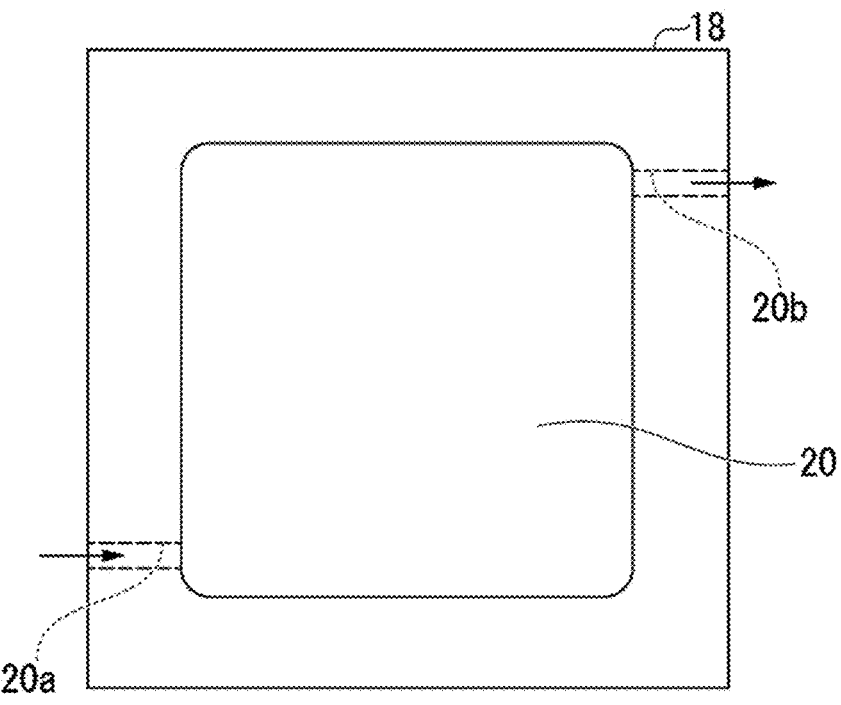
FIG. 2 is a schematic view of an example of a spacer that can be used in the plate-like selective permeable membrane parallel type metal ion recovery device according to the embodiment of the present invention.
Figure 3:
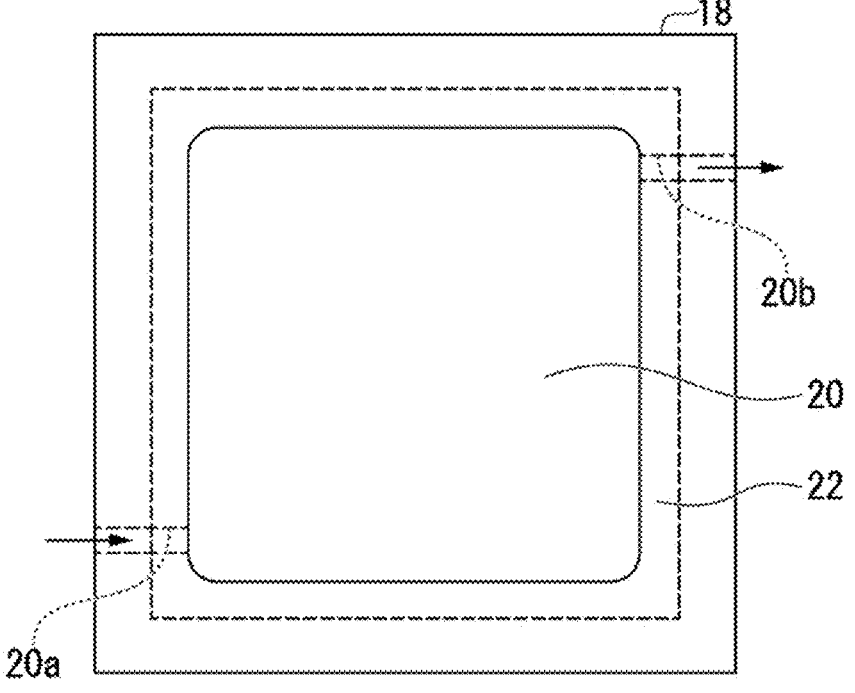
FIG. 3 is a schematic view of another example of the spacer that can be used in the plate-like selective permeable membrane parallel type metal ion recovery device according to the embodiment of the present invention.

One suitable embodiment of the first spacer 18 and the second spacer 19 is a frame shape. In FIGS. 2 and 3, examples of a spacer having a frame shape will be described. In a case in which the first spacer 18 and/or the second spacer 19 is a spacer having a frame shape shown in FIGS. 2 and 3, the porous current collector 17 is housed in an opening 20 surrounded by the frame. As shown in FIGS. 2 and 3, it is preferable that the frame-shaped spacer is provided with an inlet 20a for introducing a metal ion containing raw solution 1 or a metal ion recovery liquid 2 and an outlet 20b for extracting the metal ion containing raw solution 1 or the metal ion recovery liquid 2.

In the embodiment, as shown in FIGS. 2 and 3, it is preferable that the inlet 20a is provided below the outlet 20b. The arrangement of the inlet 20a and the outlet 20b is not limited to the examples shown in FIGS. 2 and 3.

As the first spacer 18 and the second spacer 19, a frame-shaped spacer shown in FIG. 2 (indicated by reference numeral 18 in FIG. 2) can be used. Accordingly, in a case in which the anode 15, the first spacer 18, the selective permeable membrane 14, the second spacer 19, and the cathode 16 are laminated in this order, and a load is applied so as to restrain the laminate in the direction along the lamination direction, the load can be uniformly applied to the laminate thereof. In a case in which the selective permeable membrane 14 is a sintered body, there is a possibility that the selective permeable membrane 14 may be damaged by local load application. Therefore, it is preferable to use the frame-shaped spacer as the first spacer 18 and the second spacer 19.

As a more suitable embodiment of the frame-shaped spacer, as shown in FIG. 3, a spacer including an opening 20, and a recess portion 22 surrounding the opening 20 (indicated by reference numeral 18 in FIG. 3) is an exemplary example. The porous current collector 17 is housed in the opening 20 of the frame-shaped spacer shown in FIG. 3, and the anode 15, the selective permeable membrane 14, or the cathode 16 is housed in the recess portion 22 so as to be fitted. Thus, the deviation of the anode 15, the cathode 16, the porous current collector 17, and the selective permeable membrane 14 can be prevented at a high level. In addition, when using the frame-shaped spacer shown in FIG. 3 as the first spacer 18 and the second spacer 19, the laminate can be restrained by applying a load to the peripheral portion where the recess portion 22 is not formed (non-recessed portion). Thus, the load applied to the selective permeable membrane 14 can be reduced.

Figure 4:
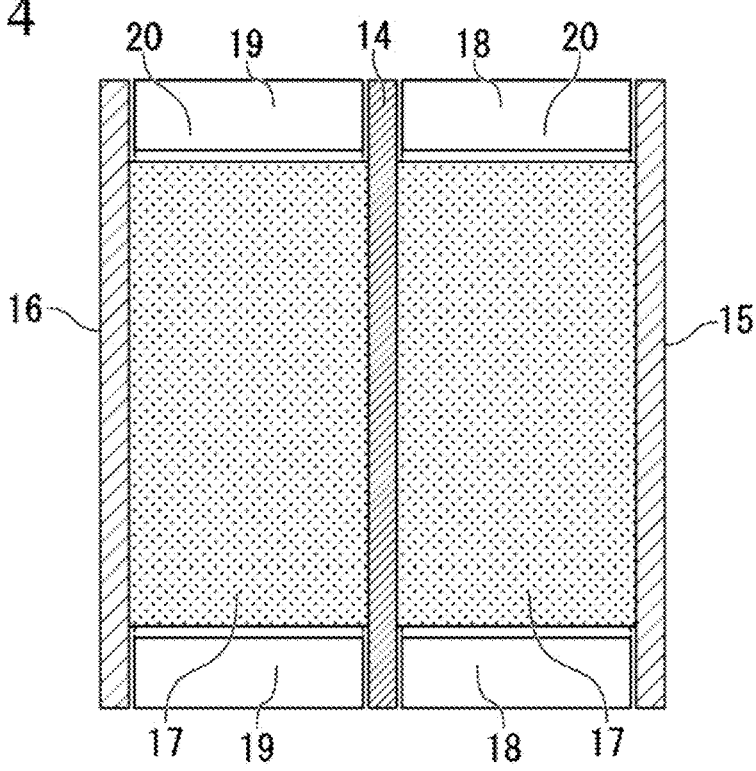
FIG. 4 is a cross-sectional view showing an example of an arrangement of electrode, a selective permeable membrane, and a spacer of the plate-like selective permeable membrane parallel type metal ion recovery device according to the embodiment of the present invention.

FIG. 4 is a cross-sectional view schematically showing one embodiment of arrangement of the anode 15, the porous current collector 17, the selective permeable membrane 14, the cathode 16, the first spacer 18, and the second spacer 19 in a case in which the frame-shaped first spacer 18 and second spacer 19 shown in FIG. 2 are provided.

Figure 5:
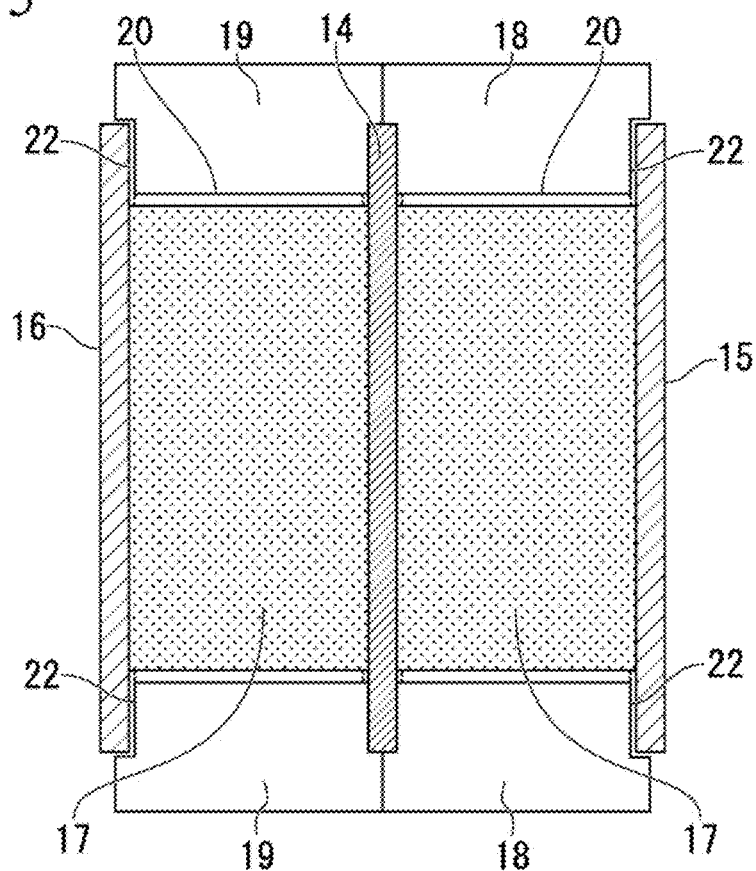
FIG. 5 is a cross-sectional view showing another example of the arrangement of the electrodes, the selective permeable membrane, and the spacer of the plate-like selective permeable membrane parallel type metal ion recovery device according to the embodiment of the present invention.

FIG. 5 is a cross-sectional view schematically showing, in a case in which the frame-shaped first spacer 18 and second spacer 19 shown in FIG. 3 are provided, one embodiment of arrangement of the anode 15, the porous current collector 17, the selective permeable membrane 14, the cathode 16, the first spacer 18, and the second spacer 19.

Figure 6:
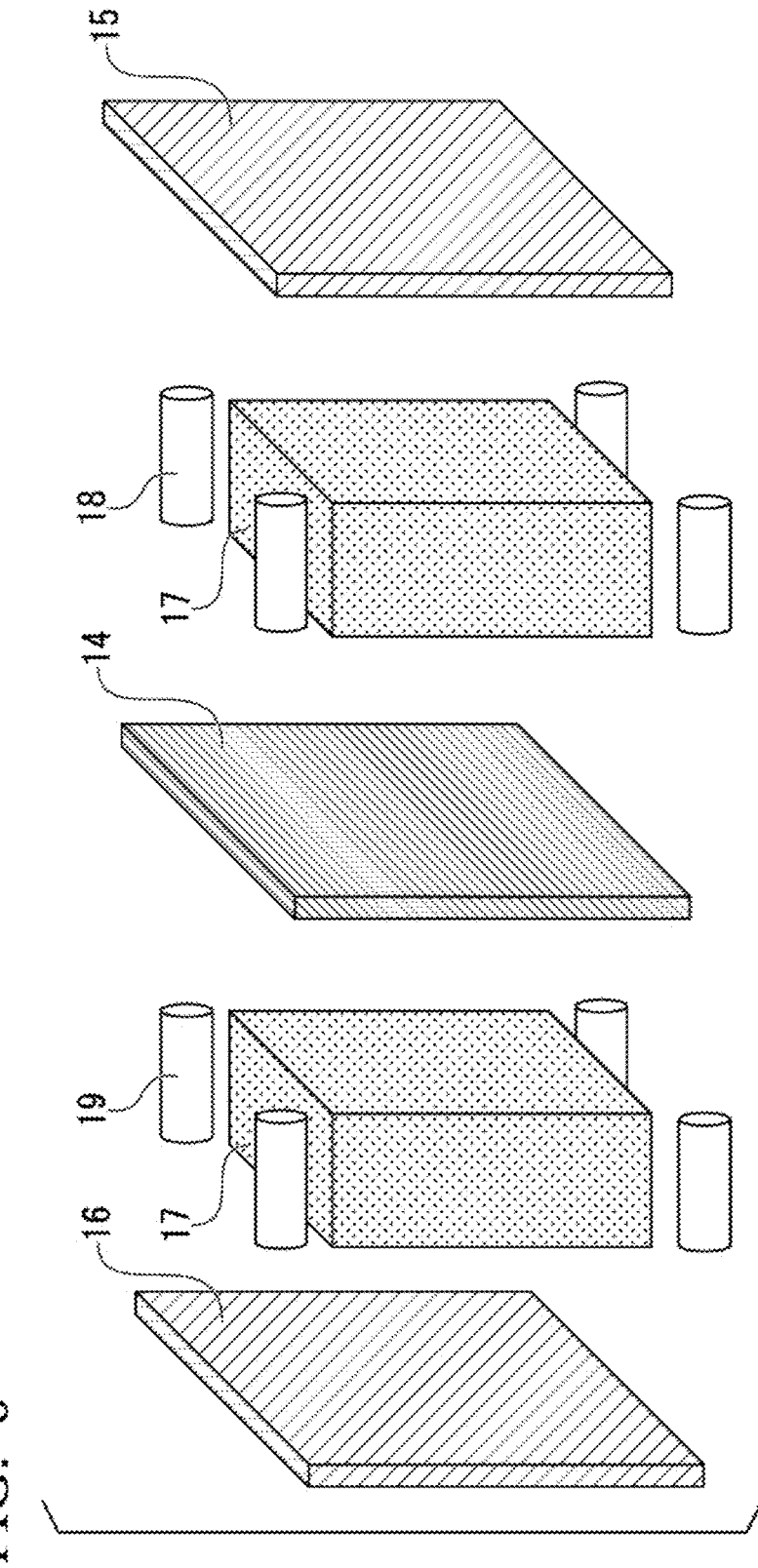
FIG. 6 is an exploded perspective view showing the example of the arrangement of the electrodes, the selective permeable membrane, and the spacer of the plate-like selective permeable membrane parallel type metal ion recovery device according to the embodiment of the present invention.

FIG. 6 is an exploded perspective view schematically showing, in a case in which block-shaped first spacer 18 and second spacer 19 shown in FIG. 6 are provided, one embodiment of arrangement of the anode 15, the porous current collector 17, the selective permeable membrane 14, the cathode 16, the first spacer 18, and the second spacer 19. The first spacer 18 and the second spacer 19 shown in FIG. 6 have a column shape. The length (height) of the column forming the first spacer 18 and the second spacer 19 is the same as the thickness of the porous current collector 17. The shape of the block-shaped first spacer 18 and the second spacer 19 is not limited to a columnar shape, and may be, for example, a polygonal shape such as a hexagonal column shape.

Figure 7:
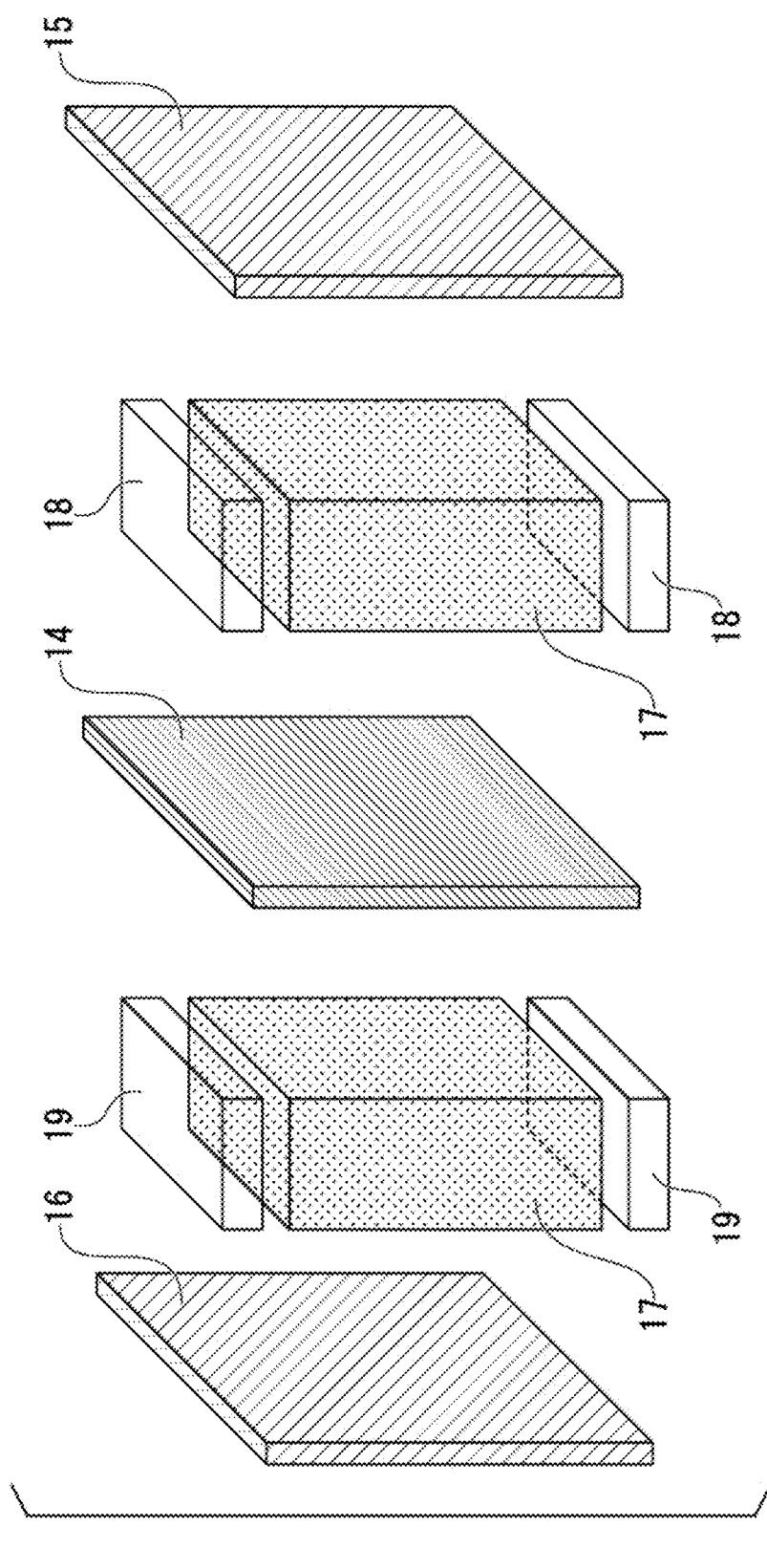
FIG. 7 is an exploded perspective view showing the other example of the arrangement of the electrodes, the selective permeable membrane, and the spacer of the plate-like selective permeable membrane parallel type metal ion recovery device according to the embodiment of the present invention.

FIG. 7 is an exploded perspective view schematically showing, in a case in which rod-like first spacer 18 and the second spacer 19 are provided, one embodiment of arrangement of the anode 15, the porous current collector 17, the selective permeable membrane 14, the cathode 16, the first spacer 18, and the second spacer 19. In FIG. 7, a case in which the horizontal direction of the drawing coincides with the long side of the rod-like space is an exemplary example, but the present invention is not limited thereto. The vertical direction may be arranged to coincide with the long side of the rod-like spacer. The first spacer 18 and the second spacer 19 shown in FIG. 7 are rectangular parallelepipeds. The shape of the contact surface of the first spacer 18 and the second spacer 19 with the porous current collector 17 is the same as the shape of the contact surface of the porous current collector 17 with the first spacer 18 and the second spacer 19.

In a suitable example of the spacer using the first spacer 18 and the second spacer 19, a deviation prevention mechanism that prevents positional deviation between the spacer and other members (for example, the selective permeable membrane 14, the anode 15, and the cathode 16) is provided. For example, an embodiment in which a material having a large friction coefficient is arranged on the contact surface where the spacer is brought into contact with other members, or an embodiment in which the contact surface is coated with a material having a large friction coefficient is an exemplary example.

It is more preferable to use an elastic material for such a deviation prevention mechanism. Thus, for example, when the laminate in which the anode 15, the first spacer 18, the selective permeable membrane 14, the second spacer 19, and the cathode 16 are laminated is restrained, by deformation of the deviation prevention mechanism, a load can be more uniformly applied to the contact surface of each member. That is, a load can be uniformly applied by the laminate.

As a material used for such a deviation prevention mechanism, for example, an elastomer material is an exemplary example. Specific examples of the elastomer material include silicone rubber, latex rubber, butyl rubber, and PVC rubber. From the viewpoint of durability, silicone rubber is preferable.

One embodiment of the metal ion recovery device will be described with reference to FIG. 1. The metal ion recovery device 10a shown in FIG. 1 has five selective permeable membranes 14, and the raw solution tanks 12 and the recovery liquid tanks 13 are respectively alternately arranged in parallel with the selective permeable membrane 14 interposed therebetween.

As shown in FIG. 1, the metal ion containing raw solution 1 is supplied to the gap that is formed by the first spacer 18 between the anode 15 and the selective permeable membrane 14. That is, the gap between the anode 15 and the selective permeable membrane 14 formed by the first spacer 18 is a part of the raw solution tank 12. In addition, the metal ion recovery liquid 2 is supplied to the gap that is formed by the second spacer 19 between the cathode 16 and the selective permeable membrane 14. That is, the gap formed by the second spacer 19 and provided between the cathode 16 and the selective permeable membrane 14 is a part of the recovery liquid tank 13.

In the metal ion recovery device 10a shown in FIG. 1, the anode 15 and the cathode 16 have a plate-like shape such that the metal ion containing raw solution 1 and the metal ion recovery liquid 2 are not allowed to flow through. Therefore, the metal ion recovery device 10a shown in FIG. 1 comprises five raw solution tanks 12 partitioned by the anode 15, and five recovery liquid tanks 13 partitioned by the cathode 16.

The raw solution tank 12, the recovery liquid tank 13, the selective permeable membrane 14, the anode 15, the cathode 16, the porous current collector 17, the first spacer 18, and the second spacer 19 may be configured to be housed in a housing 11 as shown in FIG. 1.

Alternatively, in a case in which the frame-shaped spacer shown in FIG. 2 or 3 is used as the first spacer 18 or the second spacer 19, the opening 20 of the frame-shaped spacer may be used as the raw solution tank 12 or the recovery liquid tank 13. It is preferable to share the opening 20 of the frame-shaped spacer as the raw solution tank 12 or the recovery liquid tank 13 since the space saving of the metal ion recovery device 10a can be realized.

Thus, the opening 20 can be used as the raw solution tank 12 or the recovery liquid tank 13. In this case, it is more preferable that the deviation prevention mechanism is arranged in a liquid tight manner so as to surround the opening 20.

The recovery of metal ions 3 using the metal ion recovery device 10a is performed as follows.

First, the metal ion containing raw solution 1 is supplied to the raw solution tank 12 and the metal ion recovery liquid 2 is supplied to the recovery liquid tank 13, respectively. Next, the anode 15 is set to have a positive potential and the cathode 16 is set to have a negative potential. At this time, a method of applying a positive potential to the anode 15 and a method of applying a negative potential to the cathode 16 are not particularly limited. From the viewpoint of efficiently applying a potential to each electrode, it is preferable to apply a positive potential to the anode 15 and ground the cathode 16. Thus, among the metal ions 3 in the metal ion containing raw solution 1, the metal ions that have reached the anode 15 side of the selective permeable membrane 14 are transmitted through the selective permeable membrane (typically, a metal ion conductor) 14 by ion conduction from the anode 15 side to the cathode 16 side. Then, the metal ions 3 transmitted through the selective permeable membrane 14 are recovered in the metal ion recovery liquid 2 stored in the recovery liquid tank 13.

In the metal ion recovery device 10a shown in FIG. 1, the metal ion containing raw solution 1 and the metal ion recovery liquid 2 are supplied from the lower part of the raw solution tank 12 and the recovery liquid tank 13 through pipes, respectively. In addition, in the metal ion recovery device 10a shown in FIG. 1, the metal ion containing raw solution 1 and the metal ion recovery liquid 2 are discharged from the upper portions of the raw solution tank 12 and the recovery liquid tank 13 through pipes, respectively.

The supply and discharge of the metal ion containing raw solution 1 and the metal ion recovery liquid 2 are not limited to the example of the metal ion recovery device 10a shown in FIG. 1. For example, the metal ion containing raw solution 1 may be supplied from the upper part of the raw solution tank 12 or the metal ion containing raw solution 1 may be discharged from the lower part of the raw solution tank 12. In addition, the metal ion recovery liquid 2 may be supplied from the upper part of the recovery liquid tank 13 or the metal ion recovery liquid 2 may be discharged from the lower part of the recovery liquid tank 13.

In the metal ion recovery device 10*a* according to the embodiment, the electrodes are arranged such that the surfaces of the selective permeable membranes 14 facing each other have the same polarity (positive and positive, negative and negative). That is, the anodes 15 are arranged such that the surfaces of the selective permeable membranes 14 facing each other with the raw solution tank 12 interposed therebetween have a positive polarity. Further, the cathode 16 is arranged so that the surfaces of the selective permeable membranes 14 facing each other with the recovery liquid tank 13 therebetween have a negative polarity.

In a conventional metal ion recovery device having a structure in which a metal ion containing raw solution and a metal ion recovery liquid are separated from each other using one metal ion conductor (selective permeable membrane), an anode and a cathode are arranged at both ends of one metal ion conductor. Therefore, in the conventional metal ion recovery device, in a case in which five selective permeable membranes are provided, ten electrodes (five anodes and five cathodes) are required.

On the other hand, in the metal ion recovery device 10*a* of the embodiment, the number of electrodes is six in total (three anodes and three cathodes) for five selective permeable membranes 14, and the metal ions 3 can be recovered with about half the number of electrodes. Accordingly, the metal ion recovery device 10*a* according to the embodiment has an advantage that slimming can be achieved as compared with the conventional metal ion recovery device.

Figure 8:
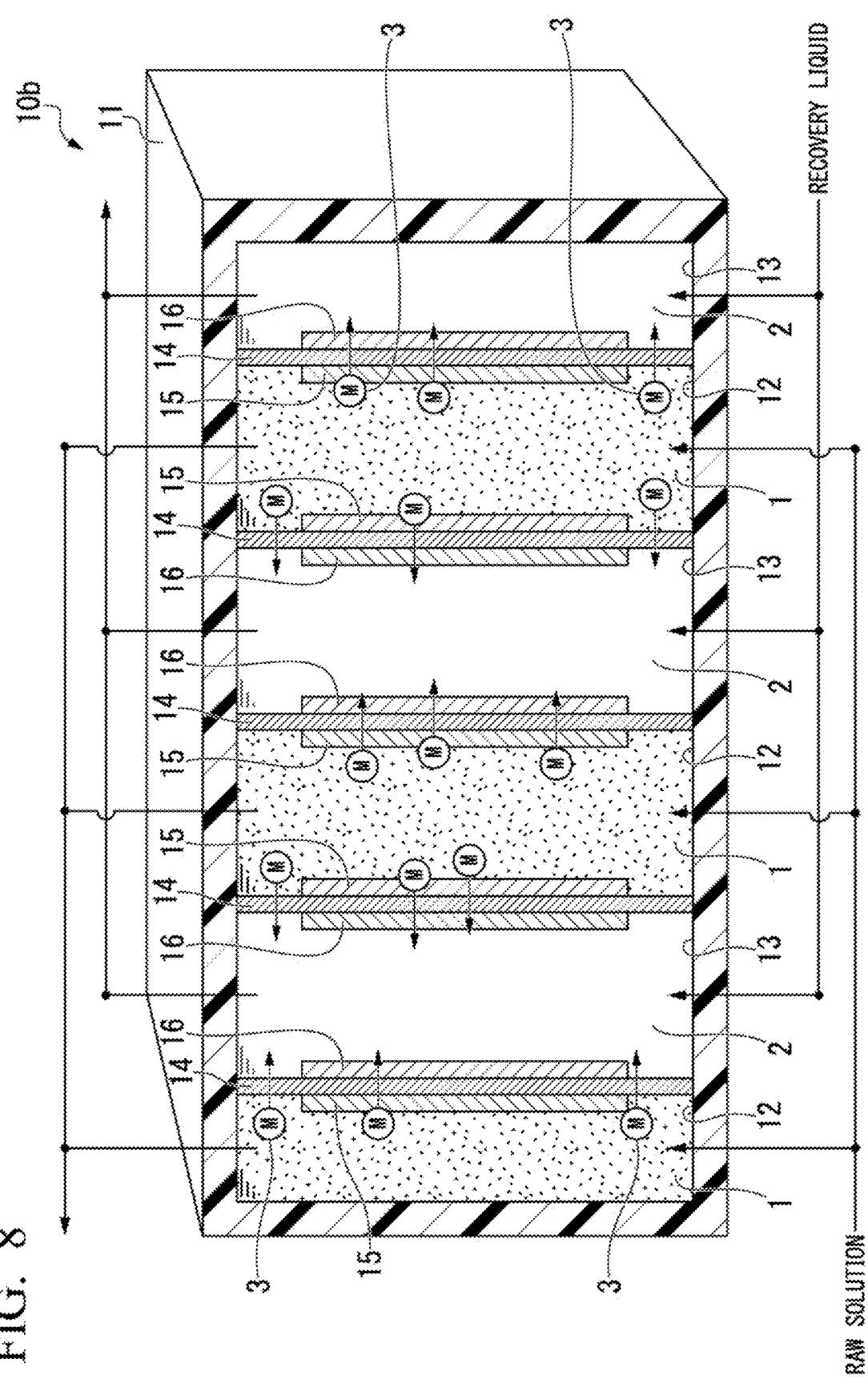
FIG. 8 is a cross-sectional perspective view of another example of the plate-like selective permeable membrane parallel type metal ion recovery device according to the embodiment of the present invention.

FIG. 8 is a cross-sectional perspective view of another example of the metal ion recovery device of the plate-like selective permeable membrane parallel type metal ion recovery device according to one embodiment of the present invention. In FIG. 8, the same members as those in FIG. 1 are denoted by the same reference numerals as those in FIG. 1, and a detailed description thereof will be omitted.

In a metal ion recovery device 10*b* shown in FIG. 8, an anode 15 is arranged in close contact with the surface of the selective permeable membrane 14 on the raw solution tank 12 side (the anode is integrally formed with the selective permeable membrane) to achieve electrical connection. In addition, the cathode 16 is arranged in close contact with the surface of the selective permeable membrane 14 on the recovery liquid tank 13 side (the cathode is integrally formed with the selective permeable membrane) to achieve electrical connection. In these points, the metal ion recovery device 10*b* shown in FIG. 8 is different from the metal ion recovery device 10*a* shown in FIG. 1. As shown in FIG. 8, since the anode 15 and the cathode 16 are arranged in close contact with the selective permeable membrane 14 to achieve electrical connection, the deviation between the selective permeable membrane 14 and the anode 15 and the deviation between the selective permeable membrane 14 and the cathode 16 can be suppressed.

That is, the metal ion recovery device 10*b* shown in FIG. 8 includes five selective permeable membranes 14, but includes five anodes 15 and five cathodes 16. In addition, the metal ion recovery device 10*b* shown in FIG. 8 in that it includes five selective permeable membranes 14 similarly to the metal ion recovery device 10*a*. However, the metal ion recovery device 10*b* shown in FIG. 8 is different from the metal ion recovery device 10*a* shown in FIG. 1 in that three raw solution tanks 12 and three recovery liquid tanks 13 are provided.

The metal ion recovery device 10*b* shown in FIG. 8 recovers the metal ions 3 on the cathode 16 side similarly to the metal ion recovery device 10*a* shown in FIG. 1. Since a porous current collector is not used in the raw solution tank 12 and the recovery liquid tank 13, the raw solution tank 12 and the recovery liquid tank 13 can be made slim. In addition, since a porous current collector is not provided in the raw solution tank 12 and the recovery liquid tank 13, the flow rate does not decrease due to the resistance of the porous current collector. Therefore, the flow rate of the metal ion containing raw solution 1 flowing in the raw solution tank 12 and the metal ion recovery liquid 2 flowing in the recovery liquid tank 13 can be increased. As the amount of metal ions 3 contacting the selective permeable membrane 14 per unit time increases, that is, as the flow rate of the metal ion containing raw solution 1 flowing in the raw solution tank 12 increases, the amount of recovered metal ions tends to increase. Accordingly, the metal ion recovery device 10*b* of the embodiment has the advantages that slimming can be achieved and a large amount of metal ions can be recovered as compared with the conventional metal ion recovery device.

In the plate-like selective permeable membrane parallel type metal ion recovery device 10*a* shown in FIG. 1 described above, the first spacer 18 and the second spacer 19 are used. Thus, in a state in which electrical connection between the selective permeable membrane 14 and the electrodes (anode 15 and cathode 16) is maintained at a high level, the number of selective permeable membranes 14 that can be mounted per metal ion recovery device 10*a* can be increased.

In the plate-like selective permeable membrane parallel type metal ion recovery device 10*b* shown in FIG. 8, the electrodes (anode 15 and cathode 16) are integrally formed on the selective permeable membrane 14. Thus, in a state in which electrical connection between the selective permeable membrane 14 and the electrode is maintained at a high level, the number of selective permeable membranes 14 that can be mounted per metal ion recovery device 10*b* can be increased.

Thus, in the embodiment, by mounting a plurality of selective permeable membranes 14 in the metal ion recovery devices 10*a* or 10*b*, the recovery amount of metal ions 3 that can be recovered per device can be increased. In addition, the metal ion recovery devices 10*a* and 10*b* according to the embodiment have an advantage that slimming can be achieved as compared with a conventional metal ion recovery device.

However, the plate-like selective permeable membrane parallel type metal ion recovery device is not limited to the above embodiment.

For example, in the metal ion recovery devices 10*a* and 10*b*, a configuration including five selective permeable membranes 14 is described as an example, but there is no limitation thereto. That is, in order to provide two or more of at least one of the raw solution tank 12 and the recovery liquid tank 13, the number of selective permeable membranes 14 may be 2 or more, and is preferably 5 or more, and more preferably 10 or more. As the number of selective permeable membranes 14 mounted in one device increases, the amount of metal ions 3 that can be recovered with one device can be increased. Thus, the number of selective permeable membranes 14 is preferably, for example, 100 or more, more preferably 500 or more, and even more preferably 1000 or more. In other words, the number of raw solution tanks 12 and recovery liquid tanks 13 partitioned by the selective permeable membrane 14 is not particularly limited as long as the number of at least one of the raw solution tank and the recovery liquid tank is two or more.

Metal Recovery System

Figure 9:
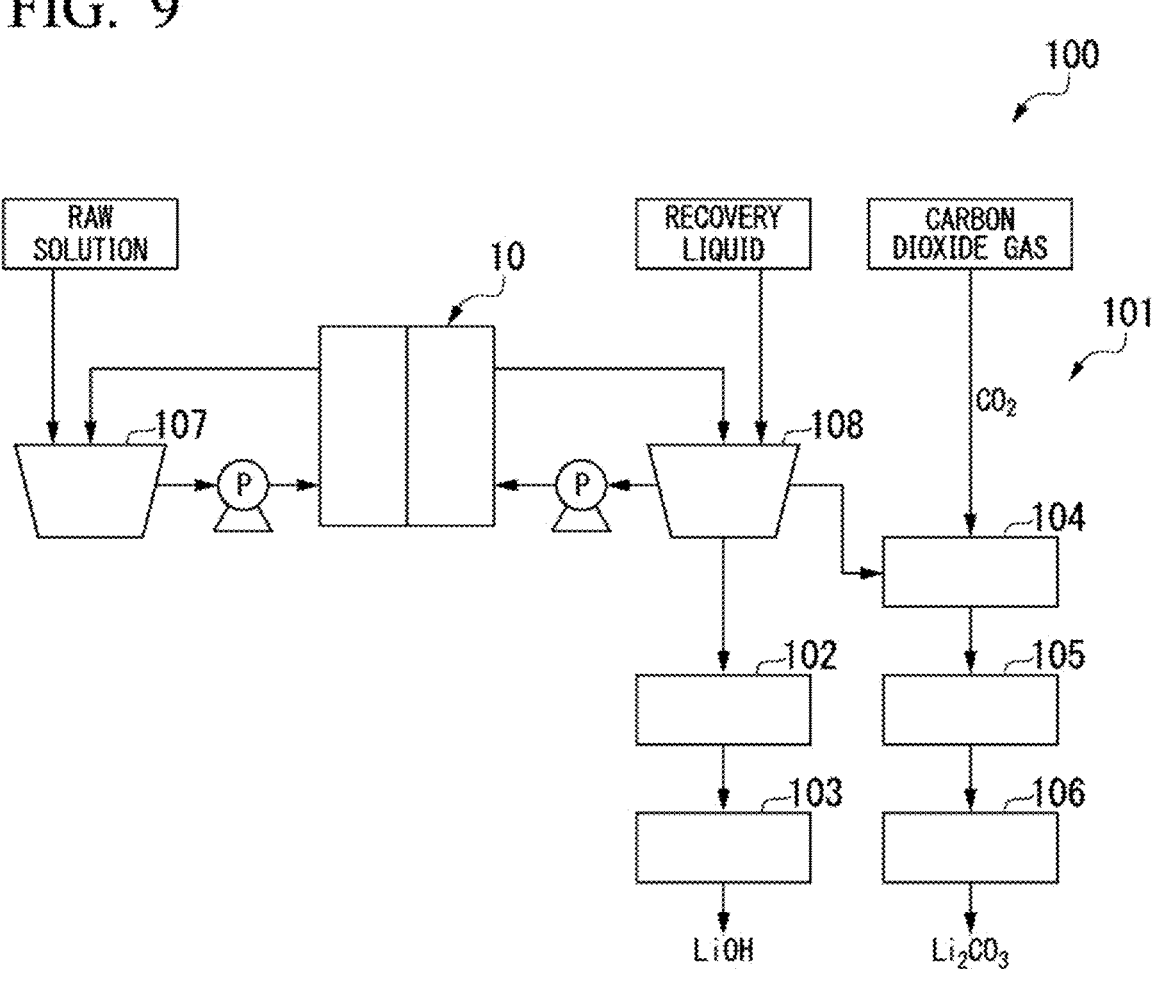
FIG. 9 is a configuration view of an example of a metal recovery system using a plate-like selective permeable membrane parallel type metal ion recovery device according to an embodiment of the present invention.

FIG. 9 is a configuration view of an example of a metal recovery system using a plate-like selective permeable membrane parallel type metal ion recovery device according to an embodiment of the present invention. Hereinafter, a case where the metal is lithium will be described as an example.

A lithium recovery system 100 shown in FIG. 9 comprises a plate-like selective permeable membrane parallel type metal ion recovery device (lithium ion recovery device) 10, and a lithium refining device 101 that extracts metal ions (lithium ions) 3 included in the metal ion recovery liquid (lithium ion recovery liquid) 2 as a solid including lithium. As the metal ion recovery device 10, the above-described metal ion recovery devices 10a and 10b can be used.

Although FIG. 9 illustrates the metal recovery system including the metal ion recovery device as an example, a metal ion recovery device unit to be described later may be provided instead of the metal ion recovery device.

The lithium refining device 101 is not particularly limited as long as the device has a mechanism that extracts metal ions as a solid including lithium. Examples of the solid including lithium include lithium hydroxide, lithium carbonate, and lithium metal.

For example, in the lithium ion recovery liquid, lithium ions exist in the form of lithium hydroxide. Therefore, by providing a drying mechanism for evaporating the solvent of the lithium ion recovery liquid, lithium hydroxide can be refined. In other words, a lithium hydroxide dryer 102 for evaporating the solvent of the lithium ion recovery liquid is an example of the lithium refining device 101.

In addition by supplying carbon dioxide gas to the lithium ion recovery liquid, lithium carbonate can be refined as a precipitate in the lithium ion recovery liquid. That is, a carbon dioxide gas bubbling device 104 for supplying carbon dioxide gas to the lithium ion recovery liquid is an example of the lithium refining device 101. Here, it is preferable that the lithium refining device 101 that produces lithium carbonate comprises a lithium carbonate dryer 105 that dries lithium carbonate precipitated in the lithium recovery liquid.

These lithium refining devices 101 may employ only one kind of mechanism, or may be mounted in combination with a plurality of refining mechanisms. Hereinafter, as shown in FIG. 9, as the lithium refining device 101, a configuration including the lithium hydroxide dryer 102, the carbon dioxide gas bubbling device 104, and the lithium carbonate dryer 105 will be described as an example.

The lithium recovery system 100 shown in FIG. 9 has a raw solution tank 107 that stores a lithium ion containing raw solution, and a recovery liquid tank 108 that stores a lithium ion recovery liquid. In addition, the lithium recovery system 100 shown in the drawing further comprises a lithium hydroxide packing machine 103 and a lithium carbonate packing machine 106.

The recovery of lithium using the lithium recovery system 100 is performed as follows.

First, a metal ion containing raw solution (lithium ion containing raw solution) 1 is stored in the raw solution tank 107. Next, the lithium ion containing raw solution stored in the raw solution tank 107 is supplied to the metal ion recovery device 10.

In addition, a lithium ion recovery liquid is stored in the recovery liquid tank 108. Next, the lithium ion recovery liquid stored in the recovery liquid tank 108 is supplied to the metal ion recovery device 10.

The metal ion recovery device 10 recovers lithium ions from the lithium ion containing raw solution in the lithium ion recovery liquid by the above method.

The lithium ion containing raw solution from which the lithium ions are recovered by the metal ion recovery device 10 is sent to the raw solution tank 107. The raw solution tank 107 discharges the lithium ion containing raw solution when the lithium ion concentration of the lithium ion containing raw solution is lower than a predetermined value. At the same time, the lithium ion containing raw solution is sent to the raw solution tank 107 from the outside.

On the other hand, the lithium ion recovery liquid from which the lithium ions are recovered by the metal ion recovery device 10 is sent to the recovery liquid tank 108. The recovery liquid tank 108 sends the lithium ion recovery liquid to the lithium refining device 101 when the lithium ion recovery liquid exceeds lithium ion concentration or higher. At the same time, a new lithium ion recovery liquid is sent to the recovery liquid tank 108 from the outside.

In the lithium refining device 101 shown in FIG. 9, the lithium ions in the lithium ion recovery liquid are extracted as lithium hydroxide ($LiOH \cdot H_2O$) powder or lithium carbonate ($Li_2CO_3$) powder.

In a case in which the lithium ions in the lithium ion recovery liquid are extracted as lithium hydroxide powder, for example, the following method is used.

The lithium ion recovery liquid is sent to the lithium hydroxide dryer 102. In the lithium hydroxide dryer 102, the water in the lithium ion recovery liquid is evaporated. Thus, it is possible to easily obtain lithium hydroxide crystals from the lithium ion recovery liquid.

In addition, when evaporating the water in the lithium ion recovery liquid, it is preferable that the water is evaporated in an environment that the lithium ion recovery liquid does not come into contact with the atmosphere (typically, $CO_2$ gas in the atmosphere). Thus, it is possible to prevent $Li_2CO_3$ from being produced by a reaction between the lithium ions in the lithium ion recovery liquid and $CO_2$ gas in the atmosphere due to contact of the lithium ion recovery liquid and the atmosphere.

Next, the lithium hydroxide powder obtained by the lithium hydroxide dryer 102 is sent to the lithium hydroxide packing machine 103. The lithium hydroxide powder is packed by the lithium hydroxide packing machine 103, and then transported to a place of use.

In a case in which the lithium ions in the lithium ion recovery liquid are extracted as lithium carbonate powder, for example, the following method is used.

The lithium ion recovery liquid is sent to the carbon dioxide gas bubbling device 104. In the carbon dioxide gas bubbling device 104, carbon dioxide gas is supplied to the lithium ion recovery liquid to transform lithium ions in the lithium ion recovery liquid (lithium hydroxide solution) to lithium carbonate. Thus, it is possible to easily obtain lithium carbonate crystals from the lithium ion recovery liquid.

Next, a precipitate (lithium carbonate) of the lithium ion recovery liquid is separated and recovered by filtration or decantation. The obtained lithium carbonate is sent to the lithium carbonate dryer 105. Then, in the lithium carbonate dryer 105, the lithium carbonate is dried to obtain lithium carbonate powder.

Next, the lithium carbonate powder obtained in the lithium carbonate dryer 105 is sent to the lithium carbonate packing machine 106. In the lithium carbonate packing machine 106, the lithium carbonate powder is packed and then transported to a place of use.

In the lithium recovery system 100 of the embodiment described above, as a lithium ion recovery device, the above-described plate-like selective permeable membrane parallel type metal ion recovery device 10 is used. Therefore, as compared with a case in which a conventional lithium ion recovery device is used, there is an advantage that slimming can be achieved. Further, lithium can be efficiently recovered. Even when a lithium recovery system comprising a metal ion recovery device unit described later instead of the metal ion recovery device 10 in the lithium recovery system 100 comprising the metal ion recovery device 10 is used, the same effect can be obtained. That is, as compared with a case in which a conventional lithium ion recovery device is used, it is possible to achieve slimming and to efficiently recover, for example, lithium ions as the metal ions 3.

Metal Ion Recovery Device Unit

Figure 10:
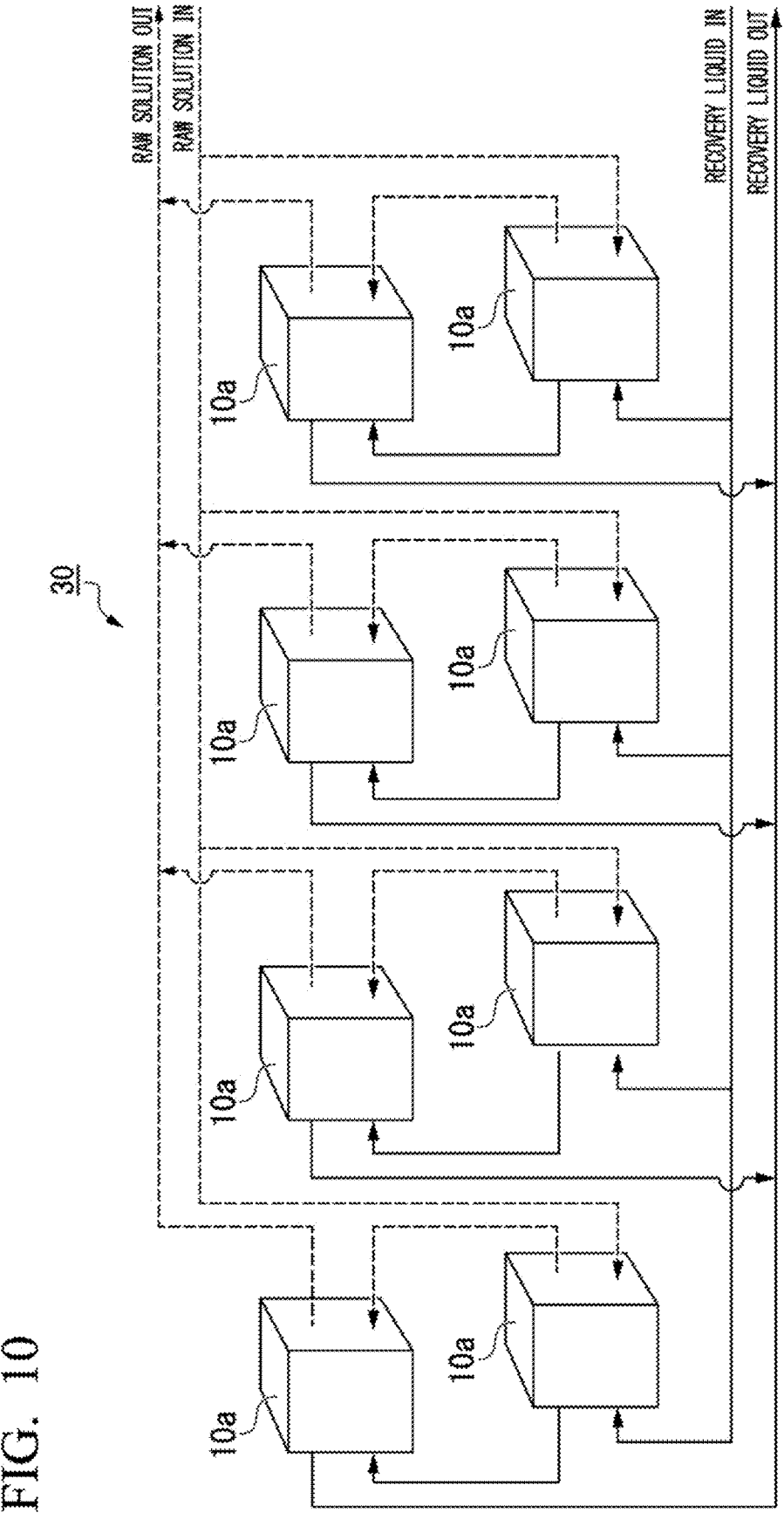
FIG. 10 is a configuration view of an example of a metal ion recovery device unit according to one embodiment of the present invention.

FIG. 10 is a configuration view of an example of a metal ion recovery device unit in which a plurality of plate-like selective permeable membrane parallel type metal ion recovery devices are connected according to one embodiment of the present invention. Hereinafter, a case in which the plate-like selective permeable membrane parallel type metal ion recovery device in FIG. 10 is the metal ion recovery device 10a shown in FIG. 1 will be described as an example.

Instead of one or all of the metal ion recovery devices 10a shown in FIG. 10, one or a plurality of metal ion recovery devices 10b shown in FIG. 8 may be provided.

A metal ion recovery device unit 30 shown in FIG. 10 has eight metal ion recovery devices 10a. In FIG. 10, two metal ion recovery devices 10a arranged vertically are connected in series such that a metal ion containing raw solution 1 and a metal ion recovery liquid 2 extracted from a lower metal ion recovery device 10a are introduced into an upper metal ion recovery device 10a. The two metal ion recovery devices 10a connected in series vertically are connected in parallel to the pipes of the metal ion containing raw solution 1 and the metal ion recovery liquid 2.

Here, for convenience, the metal ion recovery device 10a on the upper side (upstream side) and the metal ion recovery device 10a on the lower side (downstream side) will be described, but it is not limited that the actual metal ion recovery devices 10a are arranged vertically. A configuration in which the discharge and introduction of the metal ion containing raw solution 1 and the metal ion recovery liquid 2 are connected so as to be in series or parallel as shown in FIG. 10 can be understood similarly to FIG. 10.

The metal ions 3 are recovered using the metal ion recovery device unit 30 as follows.

First, the metal ion containing raw solution 1 is continuously supplied to a metal ion containing raw solution inlet of the metal ion recovery device 10a on the lower side of the two metal ion recovery devices 10a arranged vertically. Thus, the metal ion containing raw solution 1 is stored in the raw solution tank 12. In addition, the metal ion recovery liquid 2 is continuously supplied to a metal ion recovery liquid inlet of the metal ion recovery device 10a on the lower side of the two metal ion recovery devices 10a arranged vertically. Thus, the metal ion recovery liquid 2 is stored in the recovery liquid tank 13.

Next, the anode 15 of each metal ion recovery device 10a is set to have a positive potential and the cathode 16 is set to have a negative potential. Thus, among the metal ions 3 in the metal ion containing raw solution 1 stored in the raw solution tank 12, the metal ions 3 that have reached the anode 15 side of the selective permeable membrane 14 are transmitted through the selective permeable membrane 14 by ion conduction from the anode 15 side to the cathode 16 side. Then, the metal ions 3 that are transmitted through the selective permeable membrane 14 are recovered in the metal ion recovery liquid 2 stored in the recovery liquid tank 13 (refer to FIG. 1).

Next, the metal ion containing raw solution 1 stored in the raw solution tank 12 of the metal ion recovery device 10a on the lower side is extracted from a metal ion containing raw solution outlet. The extracted metal ion containing raw solution 1 is supplied to the metal ion containing raw solution inlet of the metal ion recovery device 10a on the upper side and stored in the raw solution tank 12. Similarly, the metal ion recovery liquid 2 stored in the recovery liquid tank 13 of the metal ion recovery device 10a on the lower side is extracted from the metal ion recovery liquid outlet. The extracted metal ion recovery liquid 2 is supplied to the metal ion recovery liquid inlet of the metal ion recovery device 10a on the upper side and stored in the recovery liquid tank 13.

Among the metal ions 3 in the metal ion containing raw solution 1 stored in the raw solution tank 12 of the metal ion recovery device 10a on the upper side, the metal ions 3 that have reached the anode 15 side of the selective permeable membrane 14 are transmitted through the selective permeable membrane 14 by ion conduction from the anode 15 side to the cathode 16 side. Then, the metal ions 3 that are transmitted through the selective permeable membrane 14 are recovered by the metal ion recovery liquid 2 stored in the recovery liquid tank 13.

As described above, by connecting the metal ion recovery devices 10a in series so that the metal ion recovery liquid 2 extracted from a certain metal ion recovery device 10a is introduced to another metal ion recovery device 10a, the amount of metal ions recovered in the metal ion recovery liquid 2 per unit capacity can be increased (the metal ion concentration of the metal ion recovery liquid 2 can be increased).

The metal ion recovery device unit 30 of the embodiment configured as described above has a configuration in which a plurality of metal ion recovery devices 10a are mounted. In the embodiment, a plurality of selective permeable membranes 14 are mounted on one metal ion recovery device 10a. Therefore, for example, as compared to a metal ion recovery device unit using a lithium ion recovery device including only one selective permeable membrane, the amount of metal ions 3 that can be recovered can be increased. In addition, since the raw solution tanks 12 of the independent metal ion recovery devices 10a are connected by pipes, and the recovery liquid tanks 13 are connected by the pipes, each metal ion recovery device 10a can be easily replaced.

The metal ion recovery device unit is not limited to the configuration shown in FIG. 10.

For example, all the metal ion recovery devices 10a may be connected in series, or all the metal ion recovery devices 10a may be connected in parallel to the pipes of the metal ion containing raw solution 1 and the metal ion recovery liquid 2.

In addition, the connection modes in which the metal ion containing raw solution 1 and the metal ion recovery liquid 2 are introduced to or discharged from the plurality of metal ion recovery devices 10a may be the same or mutually different connection modes. For example, liquid feeding pipes of the metal ion containing raw solution 1 may be connected in parallel so that all the metal ion containing raw solution 1 discharged from the metal ion recovery devices 10a is introduced to the pipes of the metal ion containing raw solution 1. Further, the liquid feeding pipes of the metal ion recovery liquid 2 may be connected in series so that the metal ion recovery liquid 2 discharged from the metal ion recovery device 10a is introduced to another metal ion recovery device 10a.

Although the metal ion recovery device unit 30 shown in FIG. 10 is described as an example having eight metal ion recovery devices 10a, the number of metal ion recovery devices 10a mounted in one metal ion recovery device unit 30 is not particularly limited. The number of metal ion recovery devices 10a may be 2 or more, and is preferably 5 or more and more preferably 10 or more. As the number of metal ion recovery devices 10a mounted in one device (metal ion recovery device unit 30) increases, the amount of metal ions 3 that can be recovered by one device can be increased. For this reason, the number of the metal ion recovery devices 10a is preferably, for example, 100 or more, more preferably 500 or more, and even more preferably 1000 or more.

The configuration of the metal ion recovery device unit is not limited to a configuration in which a plurality of only the above-described plate-like selective permeable membrane parallel type metal ion recovery devices are arranged. For example, one or more conventional single membrane type metal ion recovery cells including one selective permeable membrane (or a metal ion recovery device including the same) may be used together with a plurality of the metal ion recovery devices of the present embodiment. Accordingly, the plate-like selective permeable membrane parallel type metal ion recovery device and the metal ion recovery device having another configuration may be connected and applied.

Next, an example of a metal ion recovery cell in which the single membrane type metal ion recovery device (cell type metal ion recovery device) as described above can be used is shown as an example.

Figure 11:
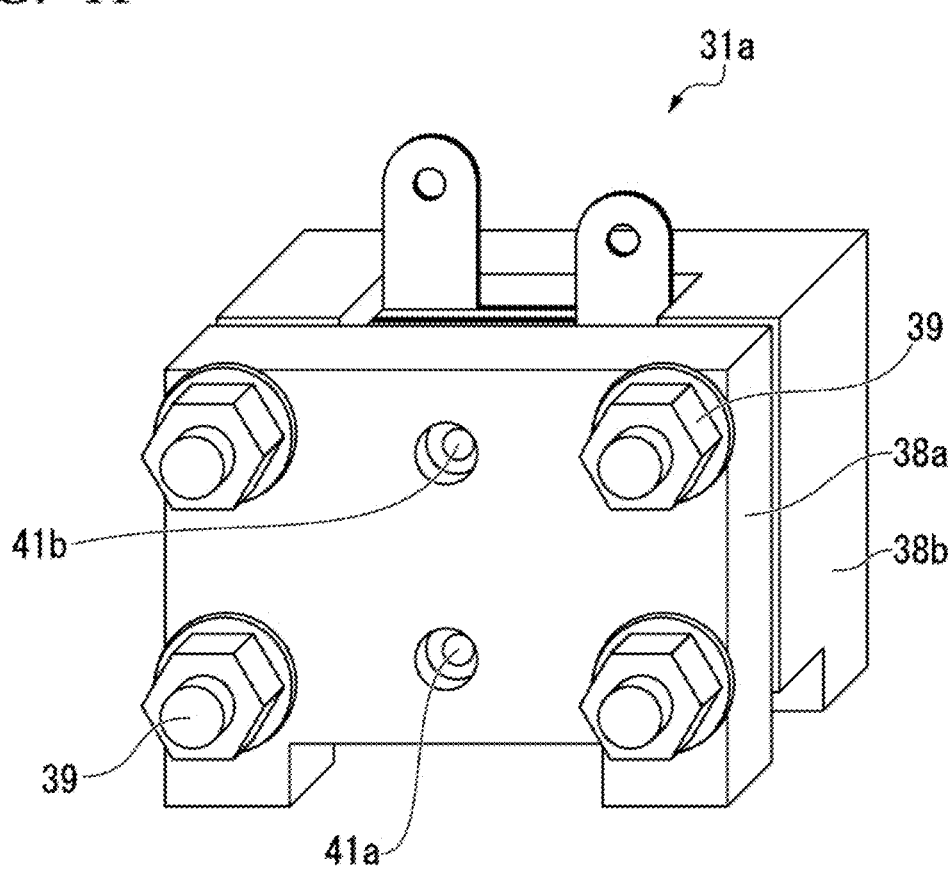
FIG. 11 is a perspective view of an example of a metal ion recovery cell that can be used in the metal ion recovery device unit according to the embodiment of the present invention.
Figure 12:
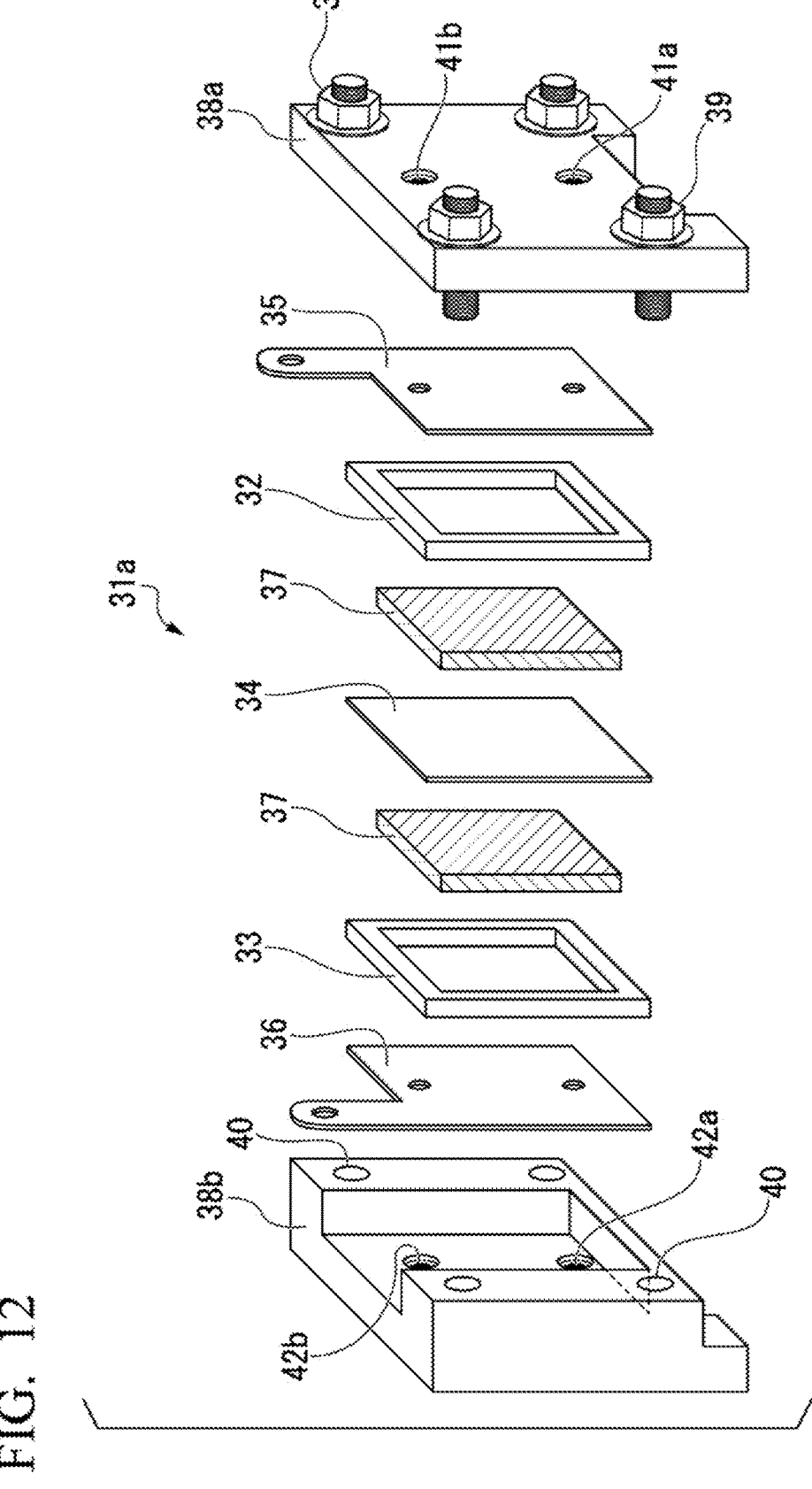
FIG. 12 is an exploded perspective view of the metal ion recovery cell shown in FIG. 11.

FIG. 11 is a perspective view of an example of the metal ion recovery cell. FIG. 12 is an exploded perspective view of the metal ion recovery cell shown in FIG. 11. The cell type metal ion recovery device comprising one or a plurality of metal ion recovery cells shown in FIG. 11 is a suitable example of a metal ion recovery device constituting the metal ion recovery device unit according to the embodiment.

The metal ion recovery cell 31a shown in FIGS. 11 and 12 is configured to house a laminate in which a cathode 36, a recovery liquid tank forming frame 33, a selective permeable membrane 34, a raw solution tank forming frame 32, and an anode 35 are laminated in this order from a cell housing portion 38b side between a cell lid portion 38a and a recess portion provided in a cell housing portion 38b. In the recovery liquid tank forming frame 33, a porous current collector 37 which electrically connects the cathode 36 and the selective permeable membrane 34 is housed. In addition, in the raw solution tank forming frame 32, a porous current collector 37 which electrically connects the anode 35 and the selective permeable membrane 34 is housed.

The cell lid portion 38a and the cell housing portion 38b are fixed by tightening a bolt 39 penetrating the cell lid portion 38a to a screw hole 40 of the cell housing portion 38b. On the outer surface of the cell lid portion 38a, a metal ion containing raw solution inlet 41a is provided at the center lower part and a metal ion containing raw solution outlet 41b is provided at the center upper part. On the outer surface of the cell housing portion 38b, a metal ion recovery liquid inlet 42a is provided at the center lower part and a metal ion recovery liquid outlet 42b is provided at the center upper part.

In the metal ion recovery cell 31a shown in FIG. 11, the metal ion containing raw solution 1 is introduced from the metal ion containing raw solution inlet 41a provided in the lower part of the cell lid portion 38a. In addition, the metal ion recovery liquid 2 is introduced into the metal ion recovery cell 31a from the metal ion recovery liquid inlet 42a provided in the lower part of the cell housing portion 38b. Then, the metal ion containing raw solution 1 is discharged from the metal ion containing raw solution outlet 41b provided in the upper part of the cell lid portion 38a. In addition, the metal ion recovery liquid 2 is discharged from the metal ion recovery liquid outlet 42b provided in the upper part of the cell housing portion 38b.

As described above, the metal ion containing raw solution inlet 41a and the metal ion recovery liquid inlet 42a (hereinafter, these are collectively referred to as "liquid inlets 41a and 42a") are provided below the metal ion containing raw solution outlet 41b and the metal ion recovery liquid outlet 42b (hereinafter, these are collectively referred to as "liquid outlets 41b and 42b"). As a result, bubbles generated in the metal ion recovery cell 31a (typically, in the raw solution tank 12 and the recovery liquid tank 13) are smoothly discharged out of the cell. According to such a configuration, it is possible to reduce the residual air bubbles in the metal ion recovery cell 31a.

In the metal ion recovery cell 31a shown in FIG. 11, the configuration in which the liquid inlets 41a and 42a are provided in the lower part of the cell lid portion 38a and the cell housing portion 38b and the liquid outlets 41b and 42b are provided in the upper part of the cell lid portion 38a and the cell housing portion 38b is described as an example, but the present invention is not limited thereto. For example, the metal ion containing raw solution outlet 41b may be provided in the lower part of the cell lid portion 38a. In addition, for example, the metal ion recovery liquid outlet 42b may be provided in the lower part of the cell housing portion 38b.

In the metal ion recovery cell 31a shown in FIG. 11, the configuration in which the liquid inlets 41a and 42a and the liquid outlets 41b and 42b are provided on the wide surfaces of the cell lid portion 38a and the cell housing portion 38b (surfaces in the lamination direction) is described as an example, but the present invention is not limited thereto. For example, the liquid inlets 41a and 42a and the liquid outlets 41b and 42b may be provided on the narrow surface (side surface) of the cell lid portion 38a or the cell housing portion 38b.

Figure 13:
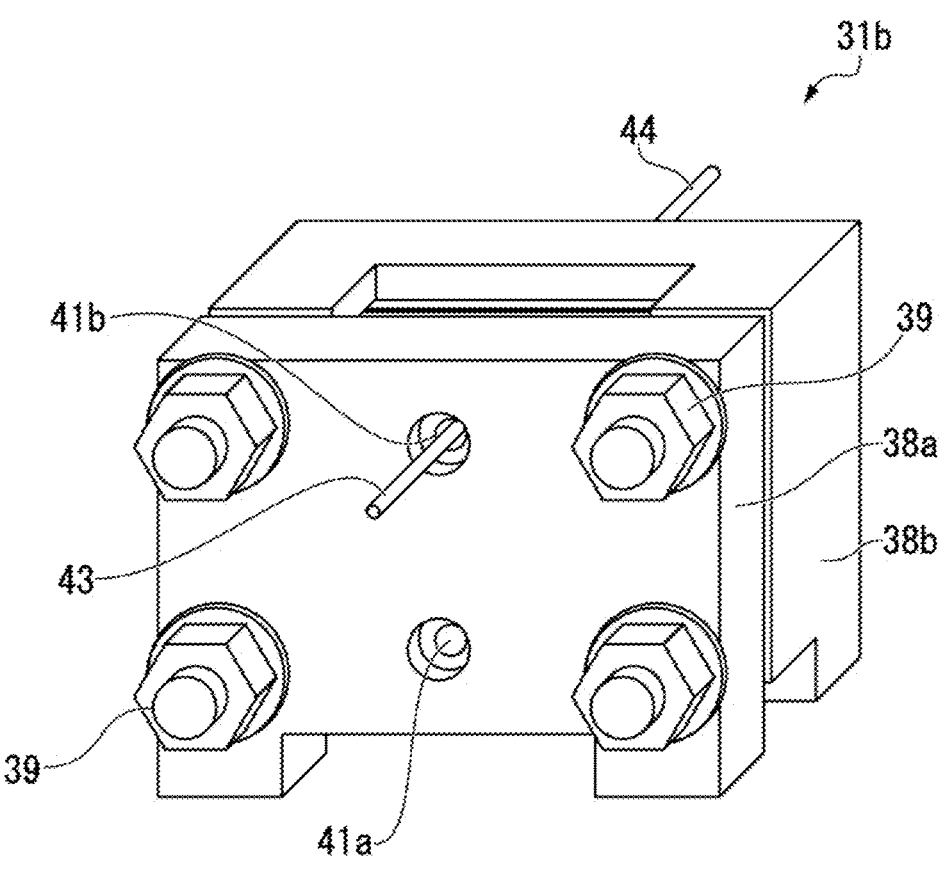
FIG. 13 is a perspective view of another example of the metal ion recovery cell that can be used in the metal ion recovery device unit according to the embodiment of the present invention.
Figure 14:
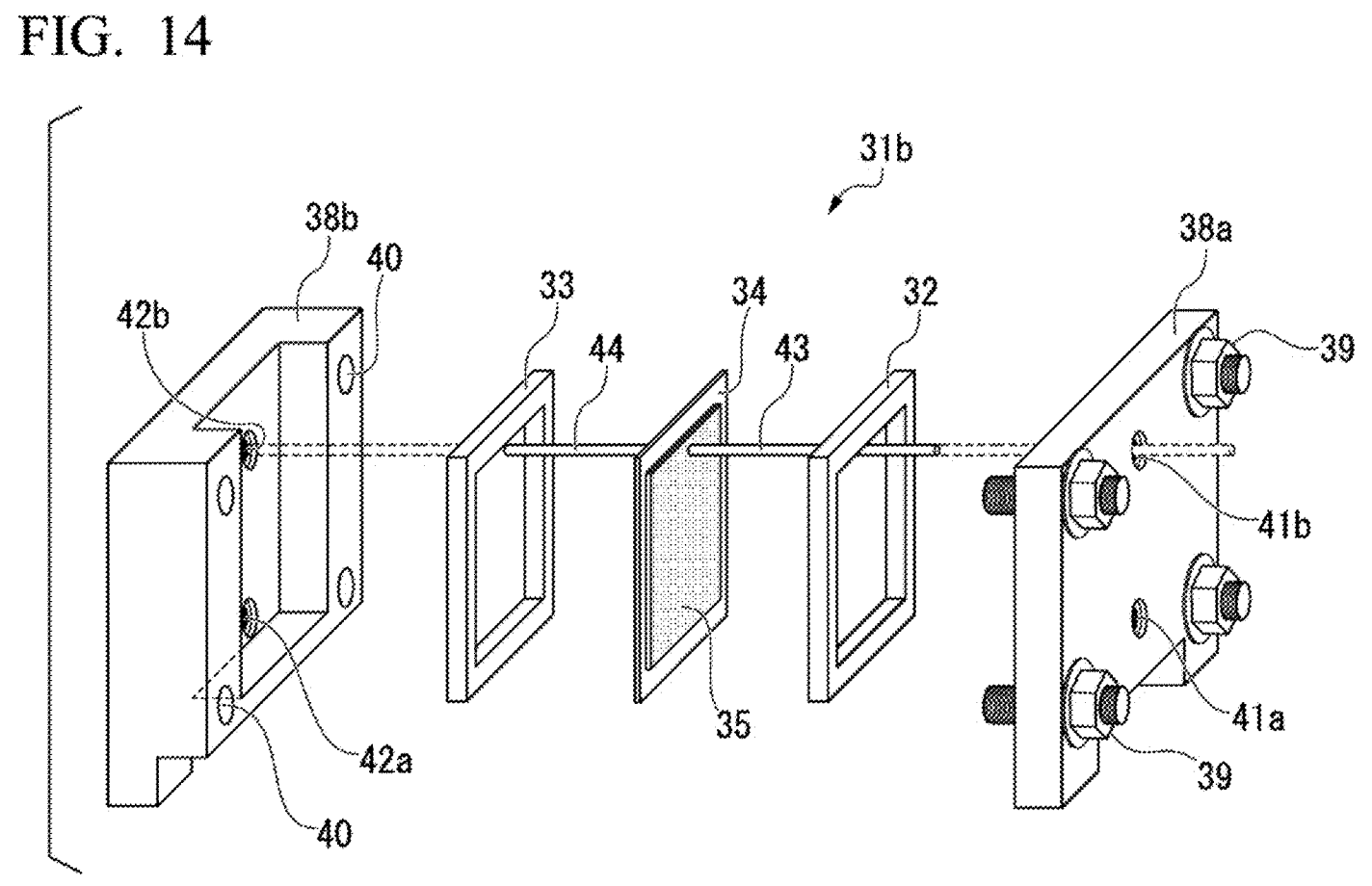

FIG. 13 is a perspective view of another example of the metal ion recovery cell that can be used in the metal ion recovery device unit according to one embodiment of the present invention. FIG. 14 is an exploded perspective view of the metal ion recovery cell shown in FIG. 13. In FIGS. 13 and 14, the same members as those in FIGS. 11 and 12 are denoted by the same reference numerals as those in FIGS. 11 and 12, and the detailed description thereof will be omitted.

In a metal ion recovery cell 31b shown in FIG. 13 and FIG. 14, the anode 35 is arranged in close contact with the surface of the selective permeable membrane 34 on the raw solution tank forming frame 32 side (the anode is formed integrally with the selective permeable membrane) to achieve electrical connection. In addition, the cathode 36 (not shown in FIG. 14) is arranged in close contact with the surface of the selective permeable membrane 34 on the recovery liquid tank forming frame 33 side (the cathode is integrally formed with the selective permeable membrane)

to achieve electrical connection. From these points, the metal ion recovery cell 31*b* shown in FIGS. 13 and 14 is different from the metal ion recovery cell 31*a* shown in FIGS. 11 and 12.

Here, in the metal ion recovery cell 31*b* shown in FIGS. 13 and 14, an anode lead wire 43 is drawn from the metal ion containing raw solution outlet 41*b*. In addition, a cathode lead wire 44 is led from the metal ion recovery liquid outlet 42*b*.

In the metal ion recovery cell 31*b* shown in FIGS. 13 and 14, a porous current collector is not housed in the raw solution tank forming frame 32 and the recovery liquid tank forming frame 33. Therefore, the raw solution tank forming frame 32 and the recovery liquid tank forming frame 33 can be made slim. Further, the flow rate of the metal ion containing raw solution 1 flowing in the raw solution tank forming frame 32 and the flow rate of the metal ion recovery liquid 2 flowing in the recovery liquid tank forming frame 33 can be increased. As the metal ions 3 that come into contact with the selective permeable membrane 34 per unit time increases, that is, the flow rate of the metal ion containing raw solution 1 flowing in the raw solution tank forming frame 32 increases, the amount of metal ions recovered tends to increase. Accordingly, the metal ion recovery cell 31*b* of the embodiment can be made slim and can recover a large amount of metal ions 3.

REFERENCE SIGNS LIST

1: metal ion containing raw solution
2: metal ion recovery liquid
3: metal ion (lithium ion)
10*a*, 10*b*: metal ion recovery device
11: housing
12: raw solution tank
13: recovery liquid tank
14: selective permeable membrane
15: anode
16: cathode
17: porous current collector
18: first spacer
19: second spacer
20: opening
22: recess portion
31*a*, 31*b*: metal ion recovery cell
32: raw solution tank forming frame
33: recovery liquid tank forming frame
34: selective permeable membrane
35: anode
36: cathode
37: porous current collector
38*a*: cell lid portion
38*b*: cell housing portion
39: bolt
40: screw hole
41*a*: metal ion containing raw solution inlet
41*b*: metal ion containing raw solution outlet
42*a*: metal ion recovery liquid inlet
42*b*: metal ion recovery liquid outlet
43: anode lead wire
44: cathode lead wire
100: lithium recovery system
101: lithium refining device
102: lithium hydroxide dryer
103: lithium hydroxide packing machine
104: carbon dioxide gas bubbling device
105: lithium carbonate dryer 106: lithium carbonate packing machine
107: raw solution tank
108: recovery liquid tank

What is claimed is:

1. A metal ion recovery device comprising:
a raw solution tank that is configured to store a metal ion containing raw solution including metal ions;
a recovery liquid tank that is configured to store a metal ion recovery liquid including metal ions recovered from the metal ion containing raw solution;
a metal ion selective permeable membrane that is a sintered body configured to be in contact with the metal ion containing raw solution on one side, to be in contact with the metal ion recovery liquid on another side, and to selectively transmit the metal ions from the metal ion containing raw solution to the metal ion recovery liquid;
an anode that is positioned to be in contact with the metal ion containing raw solution;
a cathode that is positioned to be in contact with the metal ion recovery liquid;
a first porous current collector that is formed of a conductive material and is in electrical connection with the metal ion selective permeable membrane and one of the anode and the cathode;
a first spacer that is configured to maintain a first gap between the metal ion selective permeable membrane and the one of the anode and the cathode, the first porous current collector being housed in the first gap; and
a second spacer that is configured to maintain a second gap between the metal ion selective permeable membrane and the other one of the anode and the cathode,
wherein the first spacer is a frame shape,
and the second spacer is a frame shape,
wherein at least one of the first spacer and the second spacer comprises:
an opening;
a recess portion surrounding the opening; and
a peripheral non-recessed portion,
wherein the metal ion selective permeable membrane is housed in the recess portion so as to be fitted therein, thereby preventing positional deviation of the metal ion selective permeable membrane; and
a load is uniformly applied to a laminate in which the anode, the first spacer, the metal ion selective permeable membrane, the second spacer, and the cathode are laminated in this order in a direction along a lamination direction by the first spacer and the second spacer, the load is applied to the non-recessed portion of the at least one of the first spacer and the second spacer, thereby reducing the load applied directly to the metal ion selective permeable membrane.

2. The metal ion recovery device according to claim 1, wherein the raw solution tank and the recovery liquid tank are alternately arranged in parallel through the metal ion selective permeable membrane.

3. The metal ion recovery device according to claim 1, wherein the metal ion is a lithium ion.

4. A metal ion recovery device unit comprising:
a plurality of the metal ion recovery devices according to claim 1,
wherein each of the metal ion recovery devices is connected by a pipe connecting the raw solution tanks and a pipe connecting the recovery liquid tanks.

5. A metal recovery system comprising:

the metal ion recovery device unit according to claim 4; and a refining device that is connected to the recovery liquid tank of the metal ion recovery device unit and is configured to extract metal ions included in the metal ion recovery liquid as a solid, the solid containing a metal of the extracted metal ions.

6. A metal ion recovery method comprising:

using the metal ion recovery device unit according to claim 4, transmitting metal ions included in the metal ion containing raw solution stored in the raw solution tank of the metal ion recovery device unit through the metal ion selective permeable membrane, and recovering the metal ions with the metal ion recovery liquid stored in the recovery liquid tank.

7. A metal recovery system comprising:

the metal ion recovery device according to claim 1; and a refining device that is connected to the recovery liquid tank of the metal ion recovery device and is configured to extract metal ions included in the metal ion recovery liquid as a solid, the solid containing a metal of the extracted metal ions.

8. The metal recovery system of claim 7, wherein the extracted metal ions are lithium ions and the solid is one or more of lithium hydroxide, lithium carbonate, and lithium metal.

9. A metal ion recovery method comprising:

using the metal ion recovery device according to claim 1, transmitting metal ions included in the metal ion containing raw solution stored in the raw solution tank of the metal ion recovery device through the metal ion selective permeable membrane, and recovering the metal ions with the metal ion recovery liquid stored in the recovery liquid tank.

10. The metal ion recovery device according to claim 1, wherein a thickness of the first spacer is configured to be equal to a thickness of the first porous current collector after the first porous current collector is provided in the metal ion recovery device.

11. The metal ion recovery device according to claim 1, wherein a thickness of the first spacer is less than a thickness of the first porous current collector before the first porous current collector is provided in the metal ion recovery device.

12. The metal ion recovery device according to claim 1, further comprising:

a second porous current collector that is formed of the conductive material and is in electrical connection with the metal ion selective permeable membrane and the other one of the anode and the cathode wherein the second porous current collector is housed in the second gap.

13. The metal ion recovery device according to claim 12, wherein a thickness of the second spacer is configured to be equal to a thickness of the second porous current collector after the second porous current collector is provided in the metal ion recovery device.

14. The metal ion recovery device according to claim 12, wherein a thickness of the second spacer is less than a thickness of the second porous current collector before the second porous current collector is provided in the metal ion recovery device.

15. The metal ion recovery device according to claim 1, further comprising:

a cell housing portion having an inlet and an outlet through each of which one of the metal ion containing raw solution and the metal ion recovery liquid is flowable into and out of the metal ion recovery device; and a cell lid portion coupled to the cell housing portion and having an inlet and an outlet through each of which the other one of the metal ion containing raw solution and the metal ion recovery liquid is flowable into and out of the metal ion recovery device, wherein the first spacer is a first frame that is configured to form a portion of one of the raw solution tank and the recovery liquid tank, and wherein each of the anode, the metal ion selective permeable membrane, the cathode, the first frame, and the first porous current collector are captured between the cell housing portion and the cell lid portion when the cell housing portion is coupled to the cell lid portion.

16. The metal ion recovery device according to claim 15, further comprising:

a second porous current collector that is formed of the conductive material and is in electrical connection with the metal ion selective permeable membrane and the other one of the anode and the cathode;

a second frame that is configured to maintain a second gap between the metal ion selective permeable membrane and the other one of the anode and the cathode and to form a portion of the recovery liquid tank, the second porous current collector being housed in the second gap, wherein each of the second porous current collector and the second frame are captured between the cell housing portion and the cell lid portion when the cell housing portion is coupled to the cell lid portion.

17. The metal ion recovery device of claim 16, wherein the cell housing portion and the cell lid portion are configured to house a laminate consisting of the cathode, the first frame, the first porous current collector, the metal ion selective permeable membrane, the second porous current collector, the second frame, and the anode.

18. The metal ion recovery device according to claim 1, wherein the metal ion selective permeable membrane is the sintered body formed of lithium lanthanum titanate.

19. The metal ion recovery device according to claim 1, wherein the number of the metal ion selective permeable membrane in the one laminate is one.

* * * * *